US008037456B2

(12) United States Patent
Kawakami et al.

(10) Patent No.: US 8,037,456 B2
(45) Date of Patent: Oct. 11, 2011

(54) PROGRAM EXECUTION DEVICE

(75) Inventors: Yoshio Kawakami, Osaka (JP); Yuki Horii, Kyoto (JP)

(73) Assignee: Panasonic Corporation, Osaka (JP)

( * ) Notice: Subject to any disclaimer, the term of this patent is extended or adjusted under 35 U.S.C. 154(b) by 1235 days.

(21) Appl. No.: 10/599,740

(22) PCT Filed: Apr. 4, 2005

(86) PCT No.: PCT/JP2005/006614
§ 371 (c)(1),
(2), (4) Date: Oct. 6, 2006

(87) PCT Pub. No.: WO2005/099250
PCT Pub. Date: Oct. 20, 2005

(65) Prior Publication Data
US 2007/0277172 A1 Nov. 29, 2007

(30) Foreign Application Priority Data

Apr. 6, 2004 (JP) ................................ 2004/111803

(51) Int. Cl.
G06F 9/44 (2006.01)
G06F 9/45 (2006.01)
(52) U.S. Cl. ......... 717/127; 717/131; 717/141; 717/154
(58) Field of Classification Search .................. None
See application file for complete search history.

(56) References Cited

U.S. PATENT DOCUMENTS

| 6,230,284 | B1* | 5/2001 | Lillevold ........................ 714/13 |
| 6,381,694 | B1 | 4/2002 | Yen |
| 6,446,224 | B1 | 9/2002 | Chang et al. |
| 6,970,960 | B1* | 11/2005 | Sarfati .......................... 710/106 |
| 2001/0004352 | A1 | 6/2001 | Watanabe et al. |
| 2004/0168201 | A1 | 8/2004 | Tada et al. |
| 2006/0269222 | A1 | 11/2006 | Horii |
| 2006/0280443 | A1 | 12/2006 | Horii |
| 2006/0290775 | A1 | 12/2006 | Horii et al. |

FOREIGN PATENT DOCUMENTS

EP 0730230 A 9/1996
(Continued)

OTHER PUBLICATIONS

Cable Television Laboratories, "OpenCable Application Platform Specification", OCAP 1.0 Profile, OC-SP-OCAP 1.0-IF-109-031121, pp. 51-66 (2003).

(Continued)

*Primary Examiner* — Chuck O Kendall
(74) *Attorney, Agent, or Firm* — Greenblum & Bernstein, P.L.C.

(57) ABSTRACT

A program execution device is provided which, even when a currently executed application (program) abnormally terminates, can prevent the application from becoming unusable, and thereby improve user convenience. An MA management unit includes: an MA management unit main for receiving an instruction from an initialization subprogram and controlling the other constituent elements in the MA management unit; an XAIT obtainment analysis unit for analyzing an XAIT sent from the head end; an MA selection unit A for selecting a program to be activated, according to the XAIT analysis result; an MA activation unit for activating of the specified program; an MA monitoring unit for monitoring the operational state of the specified program and notifying when an abnormal termination has occurred; and an MA selection unit B for selecting an alternative program.

33 Claims, 34 Drawing Sheets

FOREIGN PATENT DOCUMENTS

| | | |
|---|---|---|
| JP | 7-121490 | 5/1995 |
| JP | 2000-268441 | 9/2000 |
| JP | 2001-177573 | 6/2001 |
| JP | 2001-519627 | 10/2001 |
| JP | 2003-504753 | 2/2003 |
| JP | 2003-179905 | 6/2003 |
| JP | 2004-227143 | 8/2004 |
| WO | 95/22794 A | 8/1995 |
| WO | 00/65448 A | 11/2000 |
| WO | 01/04743 | 1/2001 |
| WO | 01/72039 A | 9/2001 |

OTHER PUBLICATIONS

U.S. Appl. No. 11/612,158 to Horii et al., which was filed on Dec. 18, 2006.
U.S. Appl. No. 10/597,779 to Horii et al., which was filed on Aug. 8, 2006.
English language Abstract of JP 7-121490.
English language Abstract of JP 2003-179905.
English language Abstract of JP 2001-177573.
English language Abstract of JP 2000-268441.
English language Abstract of JP 2004-227143.

* cited by examiner

FIG. 2

| Frequency band | Usage | Modulation technique |
|---|---|---|
| 5~130MHz | Out Of Band (OOB) Data exchange between head end and terminals | QPSK |
| 130~864MHz | In-band Ordinary television broadcasting including video and audio | QAM |

FIG. 3

| Frequency band | Usage |
|---|---|
| 70~74MHz | Data transmission from head end 101 to terminal apparatuses |
| 10.0~10.1MHz | Data transmission from terminal apparatus A111 to head end 101 |
| 10.1~10.2MHz | Data transmission from terminal apparatus B112 to head end 101 |
| 10.2~10.3MHz | Data transmission from terminal apparatus C113 to head end 101 |

FIG. 4

| Frequency band | Usage |
|---|---|
| 150~156MHz | Television channel 1 |
| 156~162MHz | Television channel 2 |
| ⋮ | ⋮ |
| 310~311MHz | Radio channel 1 |
| ⋮ | ⋮ |

FIG. 14
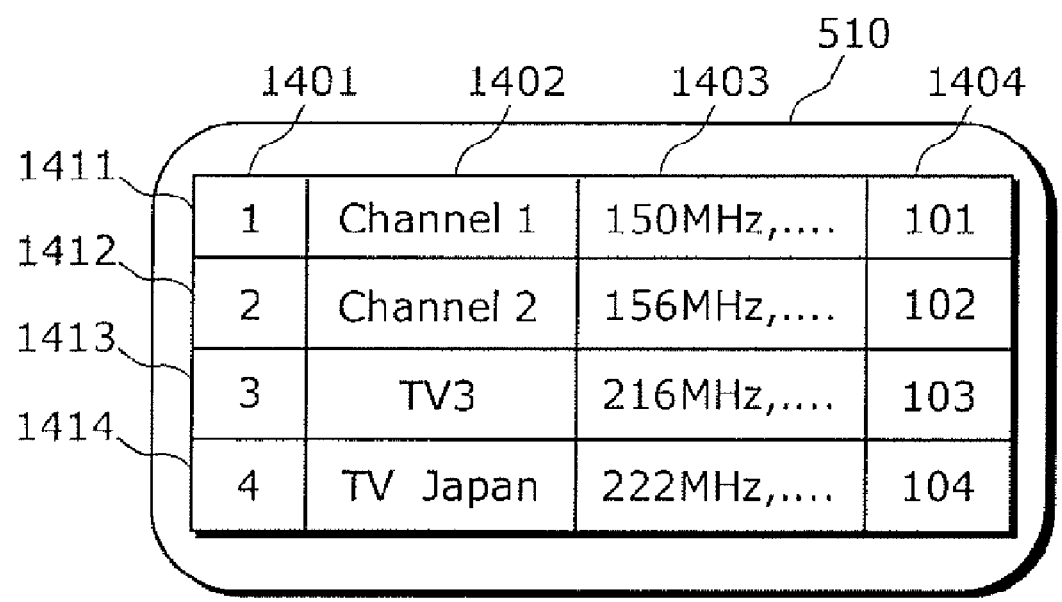
FIG. 15
(1) 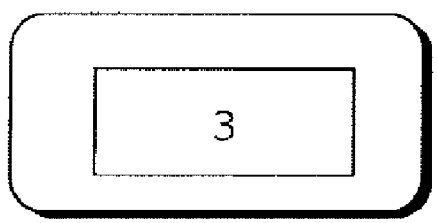　　(2) 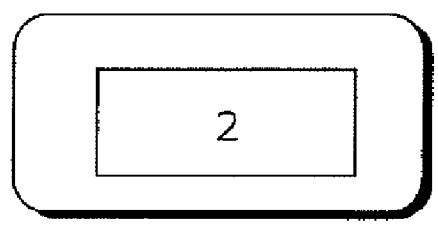
(3) 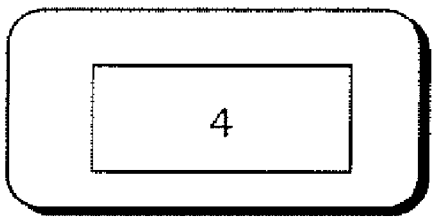

| 1811 | 301 | autostart | 1 | /a/TopXlet |
|---|---|---|---|---|
| 1812 | 302 | present | 1 | /b/GameXlet |

1801  1802  1803  1804

| 1811 | 1801 | 1802 | 1803 | 1804 | 2005 |
|---|---|---|---|---|---|
| 1811 | 301 | autostart | 1 | /a/MA1 | 1 |
| 1812 | 302 | present | 1 | /b/MA2 | 2 |

| | 1801 | 1802 | 1803 | 1804 | 2005 |
|---|---|---|---|---|---|
| 3311 | 701 | autostart | 1 | /a/PPV1Xlet | 1 |
| 3312 | 702 | present | 1 | /b/PPV2Xlet | 2 |

PROGRAM EXECUTION DEVICE

TECHNICAL FIELD

The present invention relates to a program execution device which executes a program and manages the operation of the program. The present invention particularly relates to execution of an alternative program during abnormal termination of a program, in a digital television.

BACKGROUND ART

In recent years, specifications for digital television are being formulated, and with this, an STB (Set Top Box) which is compliant with each of the specifications is being developed.

In the OCAP 1.0 specification (OCAP1.0 Profile OC-SP-OCAP1.0-IF-I09-031121), which is a specification for North American cable broadcasting, various services (for example, an interactive program) can be provided by distributing to respective homes, not only video and audio, but also the applications attached to such video and audio. In addition, an application (for example, an electronic program guide) prepared by a broadcast operator can also be operated in an STB.

The "downloading of data" in patent reference 1 describes a method for downloading, from a broadcast wave (in other words, an MPEG2 transport stream), an application related to a broadcast and executing the downloaded application. With the technology described in patent reference 1, it becomes possible to distribute, not only video and audio, but also applications to respective homes.

Furthermore, the "method and apparatus for managing an application in accordance with application life cycle" in patent reference 2 describes a technology for application operation management. In the OCAP 1.0 specification, the management of life cycles of distributed individual applications is made possible with the use of the technology described in patent reference 2.

Furthermore, the OCAP 1.0 specification stipulates that, in the case where an application prepared by a broadcast operator exists at the time of STB activation, the application prepared by the broadcast operator must be activated, as well as reactivated in the case where the application prepared by the broadcast operator abnormally terminates.

By using the conventional technology, it becomes possible, after downloading and executing an application, to monitor the life cycle of the application and detect abnormal termination. In addition, it becomes possible to re-execute an application that abnormally terminates.
Patent Reference 1: Japanese Translation of PCT International Application laid open as JP2001-519627
Patent Reference 2: Japanese Translation of PCT International Application laid open as JP2003-504753

DISCLOSURE OF INVENTION

Problems that Invention is to Solve

However, since the conventional technology re-executes the application that abnormally terminated, there is a high probability abnormal termination will occur again, and this becomes a cause for a loss of convenience for a viewer viewing a program using an STB.

As such, the present invention was conceived in view of the aforementioned circumstances, and has as an object to provide a program execution device which is capable, even in the case where a currently executed application (program) abnormally terminates, of preventing the application from becoming unusable, and thereby improving user convenience.

Means to Solve the Problems

In order to achieve the aforementioned object, the program execution device according to the present invention is a program execution device that executes a program, the program execution device including: a first program selection unit which selects, as a program to be executed, a program which is downloaded and executed; a program monitoring unit which monitors an operational state of a currently executed program; a second program selection unit which selects, as a program to be executed, a program that is of the same type as the currently executed program, in the case where abnormal termination of the currently executed program is detected by the program monitoring unit; an execution unit which executes the program selected by the first program selection unit and, in the case where abnormal termination of the currently executed program is detected by the program monitoring unit, executes the program selected by the second program selection unit; a cause obtainment unit which obtains a cause of the abnormal termination of the program detected by the program monitoring unit; and a countermeasure execution unit which executes a countermeasure based on the cause of the abnormal termination, wherein the execution unit executes the program selected by the second program selection unit, after the countermeasure is executed by the countermeasure execution unit. Accordingly, even when the currently executed program abnormally terminates, it is possible to maintain a situation in which the program is always operating, by executing a program which is of the same type as the program which abnormally terminated. Here, a program of the same type refers to a program having the same function of, for example, displaying an electronic program guide, and different user operability or display characteristics such as the amount of information in the display information and the display format. Moreover, in programs of the same type, the same program as the program that abnormally terminated is also included.

Furthermore, it is also possible that the second program selection unit selects, as the program to be executed, a program which is different from the program selected by the first program selection unit. Accordingly, it is possible to execute a different program that is of the same type as the program that abnormally terminated.

Furthermore, it is also possible that the second program selection unit selects, as the program to be executed, a program which is the same as the program selected by the first program selection unit. Accordingly, it is possible to execute, once again, the same program as the program that abnormally terminated.

Furthermore, it is also possible that the second program selection unit selects, as the program to be executed: a program which is the same as the program selected by the first program selection unit, in the case where a predetermined condition is not satisfied; and a program which is different from the program selected by the first program selection unit, in the case where the predetermined condition is satisfied. Accordingly, it becomes possible to activate the same program as the initial program only for a fixed period and, subsequently, execute a different program.

Furthermore, it is also possible that the program monitoring unit, upon detecting abnormal termination of the currently executed program, presents an occurrence of the abnormal termination to a user. Accordingly, it becomes possible for the user to recognize that abnormal termination of the currently executed program has occurred.

Furthermore, the program execution device according to the present invention is a program execution device that executes a program, the program execution device including: a first program selection unit which selects, as a program to be executed, a program which is downloaded and executed; a program monitoring unit which monitors an operational state of a currently executed program; a second program selection unit which selects, based on an instruction from a user, a program that is of the same type as the currently executed program, as a program to be executed, in the case where abnormal termination of the currently executed program is detected by the program monitoring unit; and an execution unit which executes the program selected by the first program selection unit and, in the case where abnormal termination of the currently executed program is detected by the program monitoring unit, executes the program selected by the second program selection unit. Accordingly, it becomes possible to execute the program instructed by the user.

Furthermore, it is also possible that the second program selection unit presents selectable program candidates, and selects a program selected by the user, as the program to be executed. Accordingly, it becomes possible to execute the program selected by the user. Likewise, it becomes easy for the user to determine the program to be executed.

Furthermore, it is also possible that the second program selection unit selects a predetermined program, as the program, in the case where the user does not make a selection within a predetermined time. Accordingly, it becomes possible to select a program even when the selection by the user is not made within a predetermined period of time.

Furthermore, the program execution device according to the present invention is a program execution device that executes a program, the program execution device including: a first program selection unit which selects, as a program to be executed, a program which is downloaded and executed; a program monitoring unit which monitors an operational state of a currently executed program; a second program selection unit which selects, as a program to be executed, a program that is of the same type as the currently executed program and which accepts a channel selection request from a user and performs an operation, in the case where abnormal termination of the currently executed program is detected by the program monitoring unit; and an execution unit which executes the program selected by the first program selection unit and, in the case where abnormal termination of the currently executed program is detected by the program monitoring unit, executes the program selected by the second program selection unit.

Furthermore, the program execution device according to the present invention is a program execution device that executes a program, the program execution device including a first program selection unit which selects, as a program to be executed, a program which is downloaded and executed; a program monitoring unit which monitors an operational state of a currently executed program; a second program selection unit which selects, as a program to be executed, a program that is of the same type as the currently executed program and which displays an electronic program guide, in the case where abnormal termination of the currently executed program is detected by the program monitoring unit; and an execution unit which executes the program selected by the first program selection unit and, in the case where abnormal termination of the currently executed program is detected by the program monitoring unit, executes the program selected by the second program selection unit.

Note that the present invention can be realized not only as such a program execution apparatus but also as a program execution method having the characteristic units of such a program execution apparatus as steps, and as a program which causes a computer to execute such steps. In addition, it goes without saying that it is possible distribute such a program via a recording medium such as a CD-ROM, a transmission medium such as the internet.

EFFECTS OF THE INVENTION

According to the program execution device in the present invention, even when a currently executed program abnormally terminates, it is possible to maintain a situation in which the program is always operating, by executing a program which is the same, or of the same type, as the program which abnormally terminated.

BRIEF DESCRIPTION OF DRAWINGS

FIG. 2 shows an example of the usage of frequency bands used for communications between the head end and terminal apparatuses in the cable television system according to the present invention.

FIG. 3 shows an example of the usage of frequency bands used for communications between the head end and the terminal apparatuses in the cable television system according to the present invention.

FIG. 4 shows an example of the usage of frequency bands used for communications between the head end and the terminal apparatuses in the cable television system according to the present invention.

FIG. 14 is a diagram showing an example of information stored in the secondary storage unit according to the present invention.

FIG. 15 is a diagram showing an example of information stored in a primary storage unit 511 according to the present invention.

NUMERICAL REFERENCES

1200 Program
1201 OS
1201a Kernel
1201b Library
1202 EPG
1202a TV show display unit
1202b Reproduction unit
1203 VM
1204 Service manager
1205 Library
1205a JMF
1205b AM
1205c Tuner
1205d CA
1205e POD Lib
1205f MA management unit

BEST MODE FOR CARRYING OUT THE INVENTION

Hereinafter, the embodiments of the present invention are described with reference to the diagrams.

First Embodiment

Figure 1:
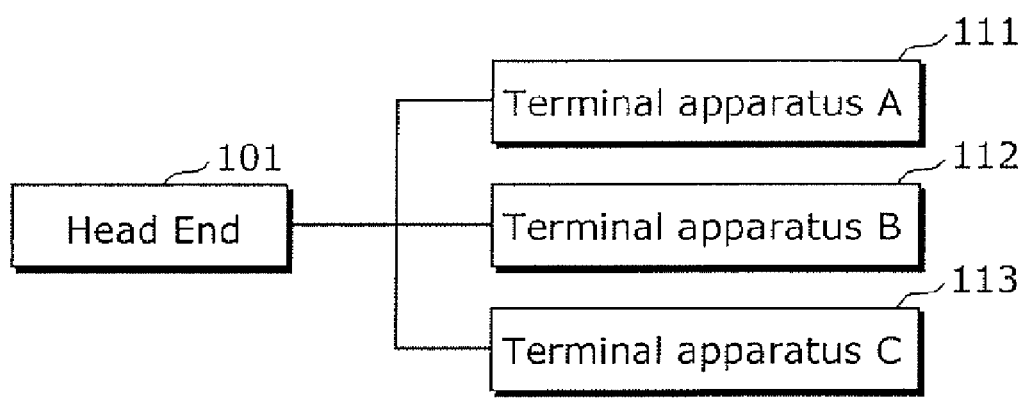
FIG. 1 is configuration diagram of the first embodiment of a cable television system according to the present invention.

An embodiment of the cable television system in the present invention shall be described with reference to the diagram. FIG. 1 is a block diagram representing the relationship of apparatuses making up a cable system. The cable system includes a head end 101, and three terminal apparatuses, namely a terminal apparatus A111, a terminal apparatus B112, and a terminal apparatus C113. In the present embodiment, three terminal apparatuses are connected to one head end. However, the present invention can be carried out even with an arbitrary number of terminal apparatuses being connected to the head end.

The head end 101 transmits, to plural terminal apparatuses, broadcast signals such as video, audio and data, and receives data transmitted from the terminal apparatuses. In order to realize this, frequency bands are divided for use in data transmission between the head end 101, and the terminal apparatus A111, the terminal apparatus B112, and the terminal apparatus C113. FIG. 2 is a table showing an example of the division of frequency bands. The frequency bands are broadly divided into two types: Out of Band (to be abbreviated as OOB) and In-Band. A frequency band of 5~130 MHz is allocated to OOB to be mainly used for data exchange between the head end 101, and the terminal apparatus A111, the terminal apparatus B112, and the terminal apparatus C113. A frequency band of 130 MHz~864 MHz is allocated to In-Band to be mainly used for broadcast channels including video and audio. QPSK is employed for OOB whereas QAM64 is employed for In-Band as modulation techniques. A detailed description of modulation techniques is omitted here, since they are publicly known techniques which are less related to the present invention. FIG. 3 shows a more specific example of how the OOB frequency band is used. A frequency band of 70 MHz~74 MHz is used to transmit data from the head end 101. In this case, all of the terminal apparatus A111, the terminal apparatus B112, and the terminal apparatus C113 receive the same data from the head end 101. Meanwhile, a frequency band of 10.0 MHz~10.1 MHz is used to transmit data from the terminal apparatus A111 to the head end 101. A frequency band of 10.1 MHz~10.2 MHz is used to transmit data from the terminal apparatus B112 to the head end 101. A frequency band of 10.2 MHz~10.3 MHz is used to transmit data from the terminal apparatus C113 to the head end 101. Accordingly, data which is unique to each terminal apparatus can be transmitted to the head end 101 from the terminal apparatus A111, the terminal apparatus B112, and the terminal apparatus C113. FIG. 4 shows an example use of the In-Band frequency band. Frequency bands of 150~156 MHz and 1561~162 MHz are allocated respectively to a television channel 1 and a television channel 2, and the subsequent frequencies are allocated to television channels at 6 MHz intervals. 310 MHz and the subsequent frequencies are allocated to radio channels at 1 MHz intervals. Each of the above channels may be used either for analog broadcasting or digital broadcasting. In the case of digital broadcasting, data is transmitted in the transport packet format compliant with the MPEG2 specification, in which case data intended for various data broadcasting systems can be transmitted, in addition to audio and video data.

The head end 101 is equipped with a QPSK modulation unit, a QAM modulation unit, and the like in order to transmit suitable broadcast signals to the respective frequency ranges. Moreover, the head end 101 is equipped with a QPSK demodulation unit for receiving data from the terminal apparatuses. Also, the head end 101 is assumed to be further equipped with various devices related to the above modulation units and demodulation unit. However, detailed descriptions for these are omitted here, since the present invention is mainly related to the terminal apparatuses.

The terminal apparatus A111 the terminal apparatus B112, and the terminal apparatus C113 receive and reproduce broadcast signals transmitted from the head end 101. Furthermore, the terminal apparatus A111, the terminal apparatus B112, and the terminal apparatus C113 transmit data unique to is each terminal apparatus to the head end 101. In the present embodiment, these three terminal apparatuses have the same configuration.

Figure 5:
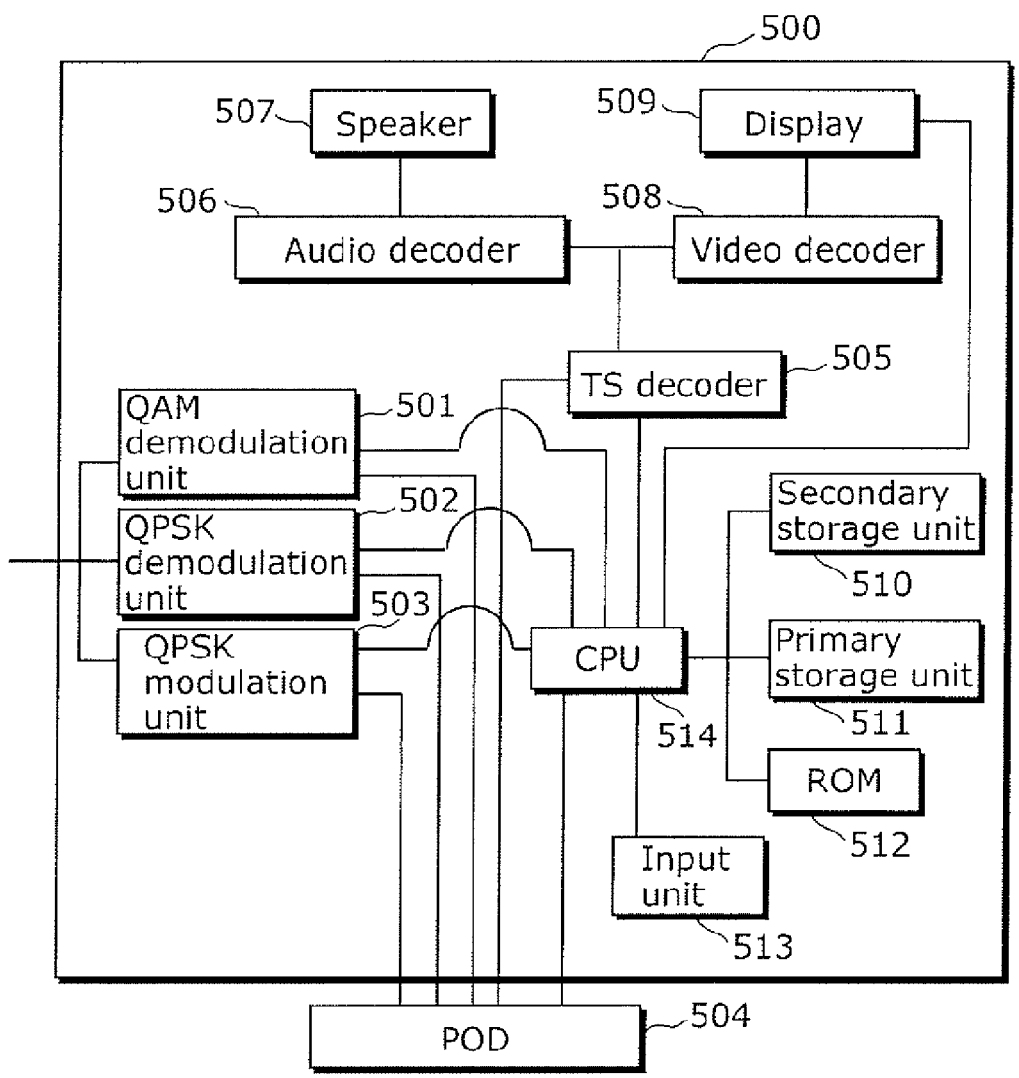
FIG. 5 is a configuration diagram showing a configuration of a terminal apparatus in the cable television system according to the present invention.

FIG. 5 is a block diagram showing a hardware configuration of the terminal apparatus. A terminal apparatus 500 includes a QAM demodulation unit 501, a QPSK demodulation unit 502, a QPSK modulation unit 503, a TS decoder 505, an audio decoder 506, a audio output unit 507, a video decoder 508, a display 509, a secondary storage unit 510, a primary storage unit 511, a ROM 512, an input unit 513, and a CPU 514. Furthermore, a POD 504 can be attached to/detached from the terminal apparatus 500.

Figure 6:
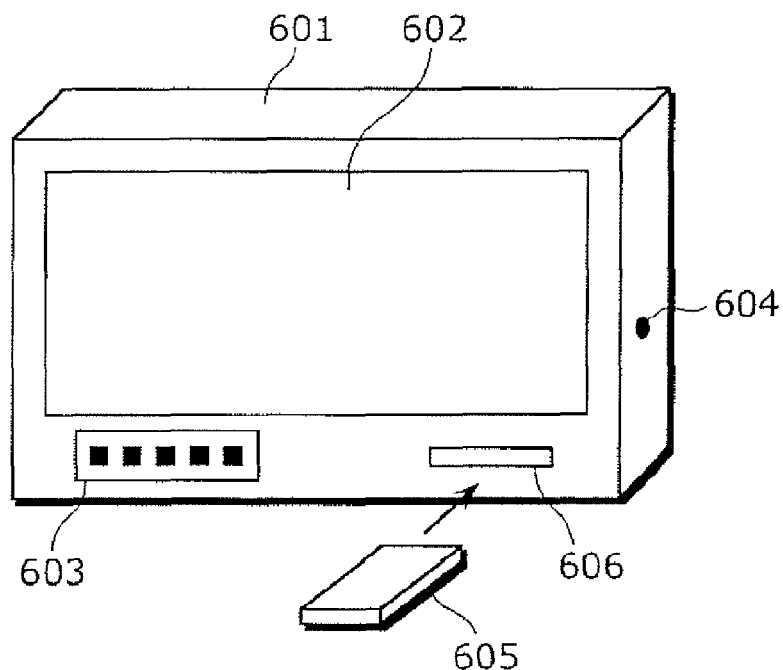
FIG. 6 shows an example of an external view of the terminal apparatus in the cable television system according to the present invention.

FIG. 6 shows a flat panel television which is an example of the external appearance of the terminal apparatus 500.

A terminal apparatus 601 contains within its housing, all constituent elements of the terminal apparatus 500 except for the POD 504.

A display 602 corresponds to the display 509 in FIG. 5.

A front panel unit 603 is configured of plural buttons, and corresponds to the input unit 513 in FIG. 5.

A signal input terminal 604 is connected with a cable line in order to perform transmission and reception of signals to and from the head end 101. In addition, the signal input terminal 604 is connected to the QAM demodulation unit 501, the QPSK demodulation unit 502, and the QPSK modulation unit 503 in FIG. 5.

A pod card 605 corresponds to the POD 504 in FIG. 5. The POD 504, as in the POD card 605 in FIG. 6, is embodied independently of the terminal apparatus 500 and can be attached to/detached from the terminal apparatus 500. Details of the POD 504 are described later.

An insertion slot 604 is an insertion slot into which the POD card 603 is inserted.

Referring to FIG. 5, the QAM demodulation unit 501 demodulates a signal which has been QAM-modulated in and transmitted from the head end 101, according to tuning information that includes a frequency specified by the CPU 514, and passes the result to the POD 504.

The QPSK demodulation unit 502 demodulates a signal which has been QPSK-modulated in and transmitted from the head end 101, according to tuning information that includes a frequency specified by the CPU 514, and passes the result to the POD 504.

The QPSK modulation unit 503 QPSK-modulates the signal passed from the POD 504, according to modulation information that includes a frequency specified by the CPU 514, and transmits the result to the head end 101.

As shown in FIG. 6, the POD 504 is detachable from the main body of the terminal apparatus 500. The definition of the connection interface between the main body of the terminal 500 and the POD 504 is given in the OpenCable (R) HOST-POD Interface Specification (OC-SP-HOSTPOD-IF-I12-030210) and specifications referred to by such specification. Here, a detailed description is omitted, and a description is given only for portions relevant to the present invention.

Figure 7:
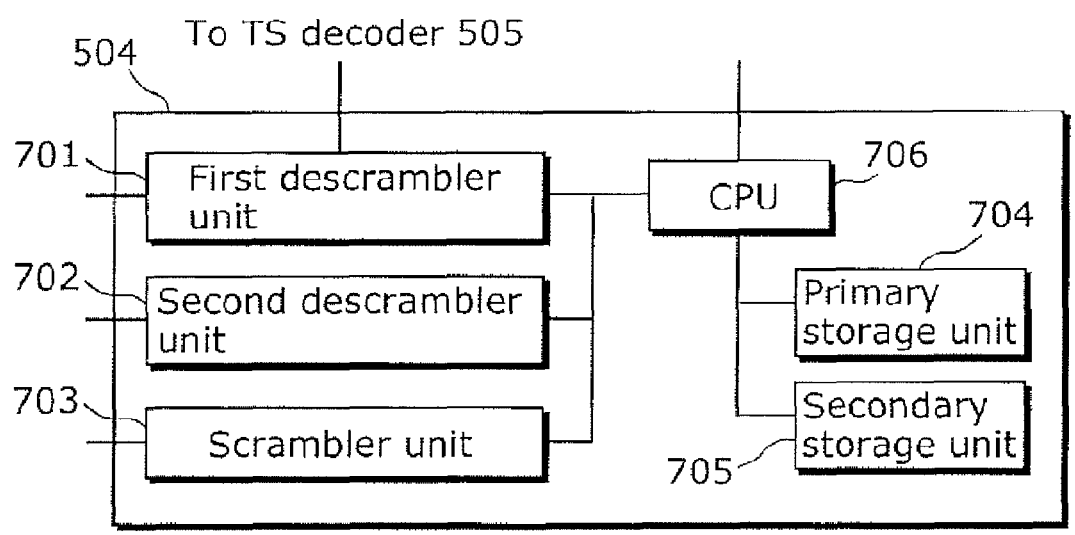
FIG. 7 is a configuration diagram showing the hardware configuration of a POD according to the present invention.

FIG. 7 is a block diagram showing an internal configuration of the POD 504. The POD 504 is made up of a first descrambler unit 701, a second descrambler unit 702, a scrambler unit 703, a primary storage unit 704, a secondary storage unit 705, and a CPU 706.

The first descrambler unit 701, under instruction from the CPU 706, receives a scrambled signal from the QAM demodulation unit 501 of the terminal apparatus 500 and descrambles such signal. Then, the first descrambler unit 701 transmits the descrambled signal to the TS decoder 505 of the terminal apparatus 500. Information required for decoding such as a key is provided by the CPU 706 as necessary. More specifically, the head end 101 broadcasts several pay channels, and when the user purchases the right to view these pay channels, the first descrambler unit 701 receives required information such as a key from the CPU 706 and performs descrambling, and the user is able to view these pay channels. When required information such as a key is not provided, the first descrambler unit 701 passes the received signal directly to the TS decoder 505 without performing descrambling.

The second descrambler unit 702, under instruction from the CPU 706, receives a scrambled signal from the QPSK demodulation unit 502 of the terminal apparatus 500 and descrambles such signal. Then, the second descrambler unit 702 passes the descrambled data to the CPU 706.

The scrambler unit 703, under instruction from the CPU 706, scrambles the data received from the CPU 706 and sends the result to the QPSK modulation unit 503 of the terminal apparatus 500.

The primary storage unit 704, specifically made up of a primary memory such as a RAM, is utilized for storing data temporarily when the CPU 706 performs processing.

Figure 8:
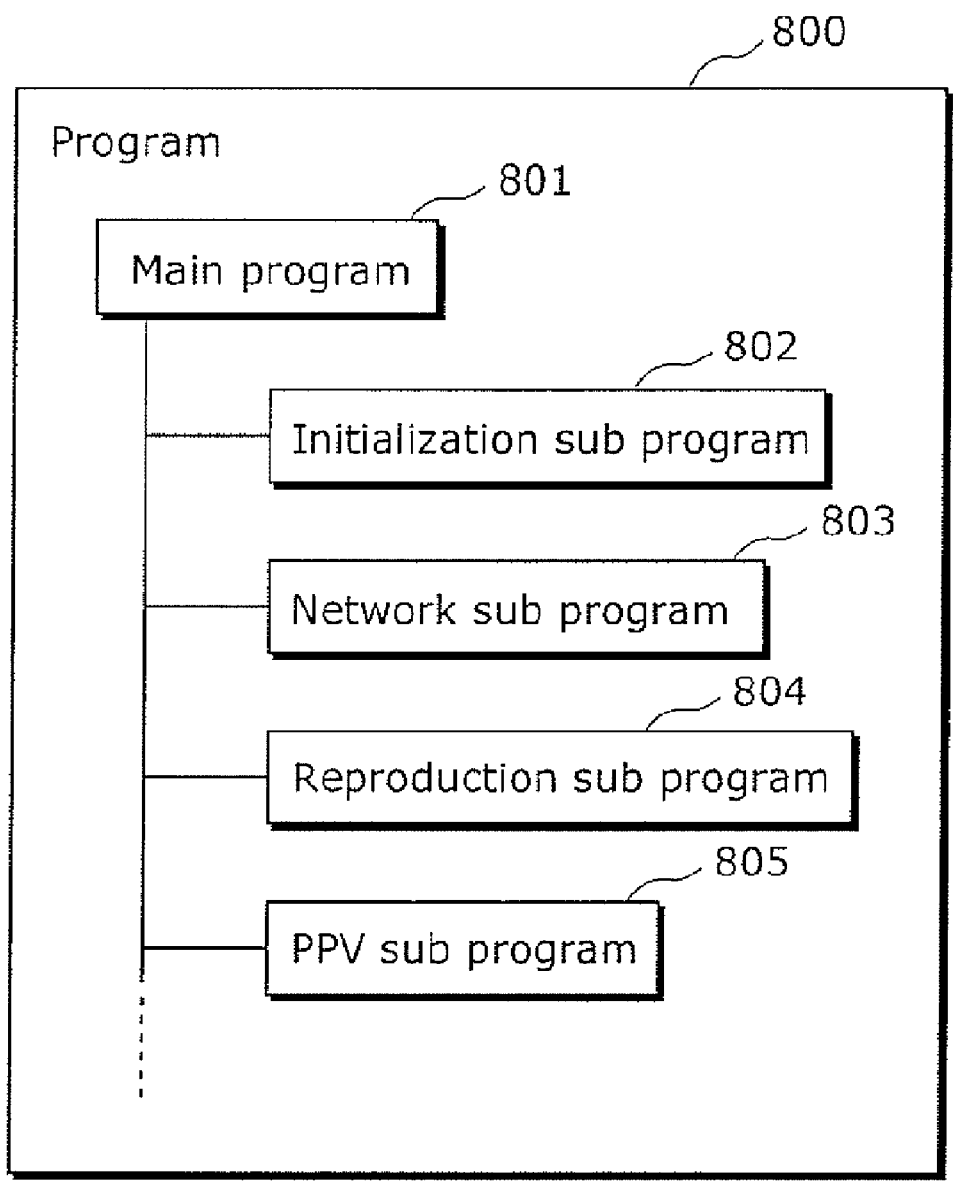
FIG. 8 is a structure diagram showing a structure of a program stored in the POD according to the present invention.

The secondary storage unit 705, specifically made up of a secondary storage memory such as a flash ROM, is utilized for storing a program to be executed by the CPU 706 as well as for storing data which should not be deleted even when the power is turned off The CPU 706 executes the program stored in the secondary storage unit 705. The program is made up of plural subprograms. FIG. 8 shows an example of the program stored by the secondary storage unit 705. In FIG. 8, a program 800 is made up of plural subprograms including a main program 801, an initialization subprogram 802, a network subprogram 803, a reproduction subprogram 804, and a PPV subprogram 805.

Here, PPV, which is an abbreviation of Pay Per View, refers to a service that allows the user to view a certain program such as a movie, on a charge basis, When the user enters his personal identification number, the purchase of the right to view the program is notified to the head end 101, scrambling is cancelled, and such program can be viewed by the user. With this viewing, the user is required to pay the purchase fee at a later date.

The main program 801, which is the subprogram activated first by the CPU 706 when the power is turned on, controls the other subprograms.

The initialization subprogram 802, which is activated by the main program 801 when the power is turned on, performs information exchange with the terminal apparatus 500 and performs initialization. The details of this initialization is defined in detail in the OpenCable (R) HOST-POD Interface Specification (OC-SP-HOSTPOD-IF-I12-030210) and in specifications referred to by such specification. Furthermore, the initialization subprogram 802 also performs initialization not defined in these specifications. Here, a part of such initialization is introduced. When the power is turned on, the initialization subprogram 802 notifies the QPSK demodulation unit 502 of a first frequency stored in the secondary storage unit 705 via the CPU 514 of the terminal apparatus 500. The QPSK demodulation unit 502 performs tuning using the provided first frequency, and transmits the resulting signal to the secondary scrambler unit 702. Moreover, the initialization subprogram 802 provides the secondary descrambler unit 702 with descrambling information such as a first key stored in the secondary storage unit 705. As a result, the secondary descrambler unit 702 performs descrambling and passes the result to the CPU 706 executing the initialization subprogram 802. As such, the initialization subprogram 802 can receive the information. In the present embodiment, the initialization subprogram 802 receives information via the network subprogram 803. A detailed description on this is given later.

Furthermore, the initialization subprogram 802 notifies the QPSK modulation unit 503 of a second frequency stored in the secondary storage unit 705 via the CPU 514 of the terminal apparatus 500. The initialization subprogram 802 provides the scrambler unit 703 with scrambling information stored in the secondary storage unit 705. When the initialization subprogram 802 provides, via the network subprogram 803, the scrambler unit 703 with information required to be sent, the scrambler unit 703 scrambles the data using the provided scrambling information, and provides the scrambled data to the QPSK modulation unit 503. The QPSK modulation unit 503 modulates the scrambled information which it received, and sends the modulated information to the head end 101.

As a result, it becomes possible for the initialization subprogram 802 to carry out two-way communication with the head end 101 via the terminal apparatus 500, the secondary descrambler unit 702, the scrambler unit 703, and the network subprogram 803.

Furthermore, the initialization subprogram 802 performs the activation of a privileged program, based on special program information transmitted by the head end 101. Details shall be described later.

The network subprogram 803, which is used by plural subprograms such as the main program 801 and the initialization subprogram 802, is a subprogram intended for carrying out a two-way communication with the head end 101. More specifically, the network subprogram 803 behaves as if other subprograms using the network subprogram 803 were carrying out a two-way communication with the head end 101 in accordance with TCP/IP. A detailed description of TCP/IP is omitted here, since it is a publicly known technique for specifying the protocols to be used when exchanging information between plural terminals. When activated by the initialization subprogram 802 at power-on time, the network subprogram 803 notifies, via the terminal apparatus 500, the head end 101 of an MAC address (an abbreviation of Media Access Control address) which is an identifier for identifying the POD 504 and which is stored in the secondary storage unit 705 beforehand, so as to request for the obtainment of an IP address. The head end 101 notifies the POD 504 of the IP address via the terminal apparatus 500, and the network subprogram 803 stores such IP address in the primary storage unit 704. From here on, the head end 101 and the POD 504 communicate with each other using such IP address as the identifier of the POD 504.

The reproduction subprogram 804 provides the first descrambler unit 701 with descrambling information such as a second key stored in the secondary storage unit 705 as well as descrambling information such as a third key provided by the terminal apparatus 500, so as to allow descrambling to be performed. Furthermore, the reproduction subprogram 804 receives, via the network subprogram 803, information indicating that the signal inputted in the first descrambler unit 701 is a PPV channel. On the notification that the signal is a PPV channel, the reproduction subprogram 804 activates the PPV subprogram 805.

Upon being activated, the PPV subprogram 805 displays, on the terminal apparatus 500, a message that prompts the user to purchase the program, and accepts an input from the user. More specifically, when information intended to be displayed on the screen is sent to the CPU 514 of the terminal apparatus 500, a program running on the CPU 514 of the terminal apparatus 500 displays the message on the display 509 of the terminal apparatus 500. Then, when the user enters the personal identification number via the input unit 513 of the terminal apparatus 500, the CPU 514 of the terminal apparatus 500 accepts it, and sends it to the PPV subprogram 805 running on the CPU 706 of the POD 504. The PPV subprogram 805 sends, to the head end 101, the accepted personal identification number via the network subprogram 803. When such personal identification number is valid, the head end 101 notifies, via the network subprogram 803, the PPV subprogram 805 of descrambling information required for descrambling such as a fourth key. The PPV subprogram 805 provides the first descrambler unit 701 with the accepted descrambling information such as the fourth key, and then the first descrambler unit 701 descrambles the signal being inputted.

Figure 9:
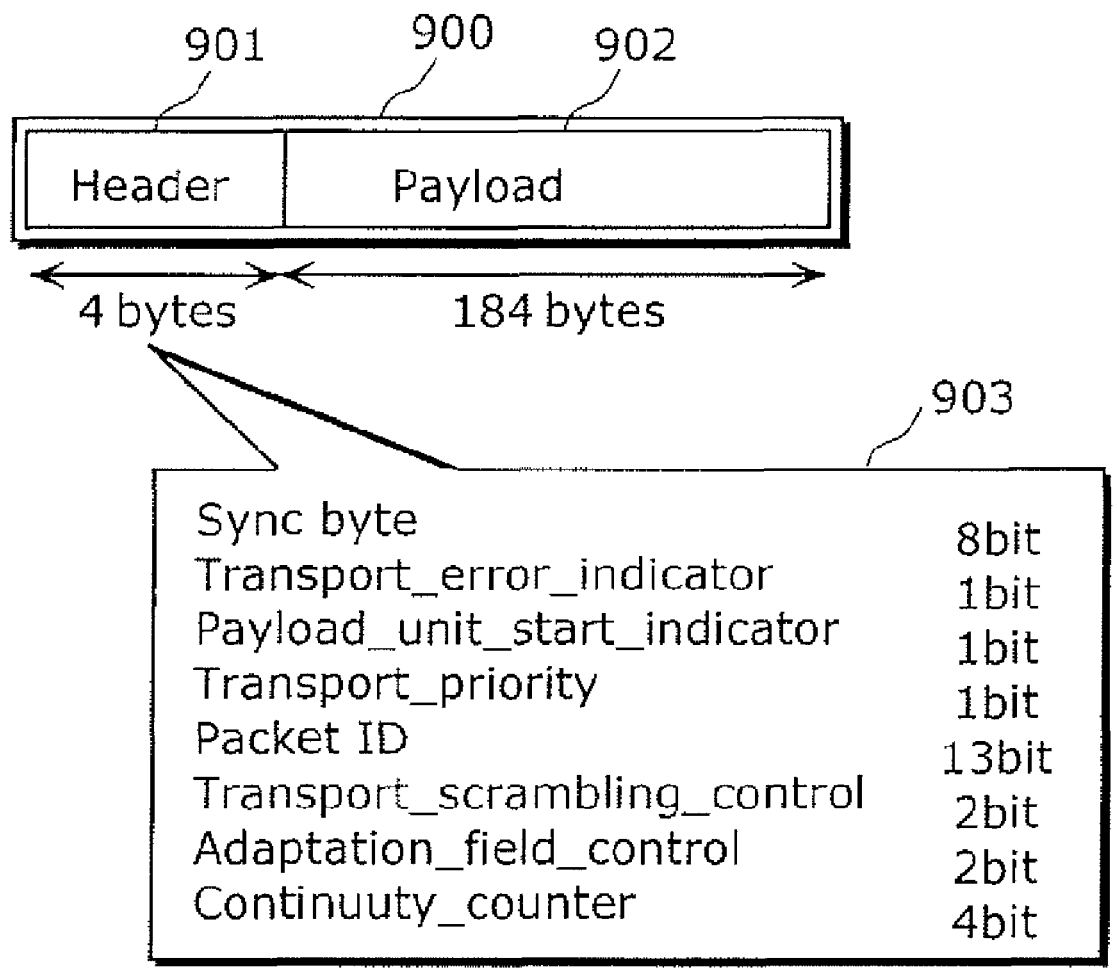
FIG. 9 is a structure diagram of a packet defined in the MPEG standard.
Figure 10:
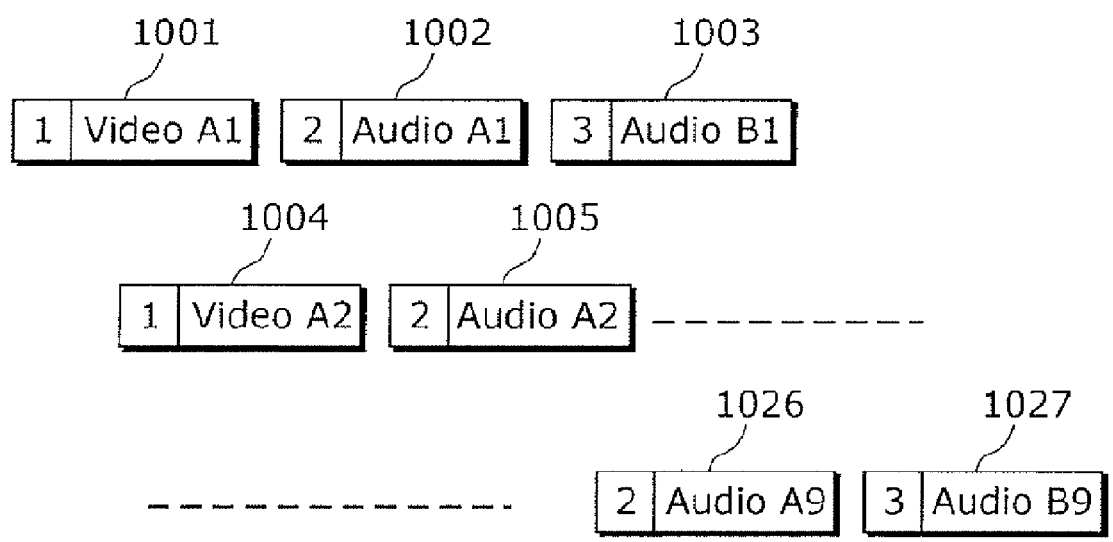
FIG. 10 is a diagram showing an example of an MPEG2 transport stream.

Referring to FIG. 5, the TS decoder 505 performs filtering on the signal accepted from the POD 504, and passes necessary data to the audio decoder 506, the video decoder 508, and the CPU 514. Here, the signal sent from the POD 504 is an MPEG2 transport stream. A detailed description about an MPEG2 transport stream is given in the MPEG specification ISO/IEC13818-1, and therefore detailed description is omitted in the present embodiment. An MPEG2 transport stream is composed of plural fixed-length packets, and a packet ID is assigned to each packet. FIG. 9 is a diagram showing the structure of a packet. 900 is a packet structured by 188 bytes having fixed length, The top four bytes is a header 901 storing information for identifying the packet, and the remaining 184 bytes is a payload 902 which contains the information to be transmitted. 903 shows the breakdown of the header 901. A packet ID is included in the 13 bits of the twelfth to twenty-fourth bits from the top. FIG. 10 is a schematic diagram illustrating plural packet strings to be transmitted. A packet 1001 carries a packet ID "1" in its header and includes the first information of video A in its payload. A packet 1002 carries a packet ID "2" in its header and includes the first information of audio A in its payload. A packet 1003 carries a packet ID "3" in its header and includes the first information of audio B in its payload.

A packet 1004 carries the packet ID "1" in its header and includes the second information of the video A in its payload, and is the continuation of the packet 1001. Similarly, packets 1005, 1026, and 1027 carry follow-on data of the other packets. By concatenating the contents of the payloads of packets with the same packet IDs in the above manner, it is possible to reproduce a continuing video and audio.

Figure 11:
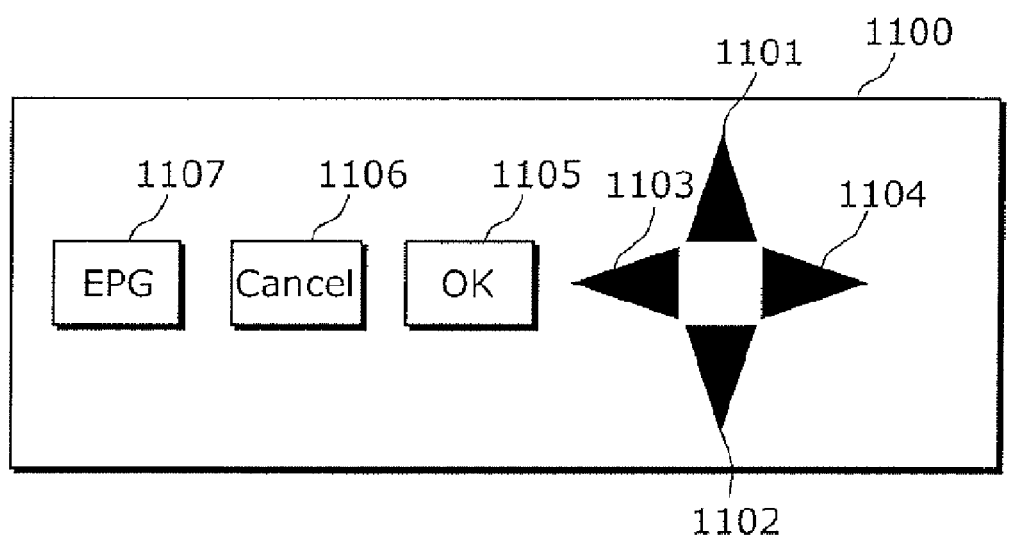
FIG. 11 is a diagram showing an example of an external is view in the case where the input unit is configured in the form of a front panel.

Referring to FIG. 10, when the CPU 514 indicates, to the TS decoder 505, the packet ID "1" as well as "the video decoder 508" as an output destination, the TS decoder 505 extracts packets with the packet ID "1" from the MPEG2 transport stream received from the POD 504, and passes them to the video decoder 508. In FIG. 11, therefore, only the video data is passed over to the video decoder 508. At the same time, when the CPU 514 indicates, to the TS decoder 505, the packet ID "2" as well as "the audio decoder 506", the TS decoder 505 extracts packets with the packet ID "2" from the MPEG2 transport stream received from the POD 504, and passes them to the audio decoder 506. In FIG. 11, only the audio data is passed over to the audio decoder 506.

This process of extracting only necessary packets according to the packet IDs corresponds to the filtering performed by the TS decoder 505. The TS decoder 505 is capable of simultaneously performing plural filtering operations instructed by the instruction of the CPU 514.

Referring to FIG. 5, the audio decoder 506 concatenates audio data embedded in the packets in the MPEG2 transport stream provided by the TS decoder 505, performs digital-to-analog conversion on the concatenated data, and outputs the result to the audio output unit 507.

The audio output unit 507 outputs the signal provided by the audio decoder 506.

The video decoder 508 concatenates video data embedded in the packets in the MPEG2 transport stream provided by the TS decoder 505, performs digital-to-analog conversion on the concatenated data, and outputs the result to the display 509.

The display 506, specifically made up of a Braun tube or liquid crystal, outputs the video signal provided by the video decoder 508, and displays a message instructed by the CPU 514.

The secondary storage unit 510, specifically made up of a flash memory or a hard disk and the like, stores and deletes data and programs specified by the CPU 514. The stored data and programs are referred to by the CPU 514. The stored data and programs are kept in storage even when power to the terminal apparatus 500 is cut off.

The primary storage unit 511, specifically made up of a RAM and the like, temporarily stores and deletes data and programs specified by the CPU 514. Stored data and programs are referred to by the CPU 514. The stored data and programs are deleted when power to the terminal apparatus 500 is cut off.

The ROM 512 is a read-only memory device, specifically made up of are a ROM, a CD-ROM, or a DVD, and the like. The ROM 512 stores a program to be executed by the CPU 514.

The input unit 513, specifically made up of a front panel or remote control, accepts an input from the user. FIG. 11 shows an example of the input unit 513 in the case where it is configured in the form of a front panel. 1100 is a front panel, and corresponds to the front panel unit 603 shown in FIG. 6. The front panel 1100 includes seven buttons, namely, an up-cursor button 1101, a down-cursor button 1102, a left-cursor button 1103, a right-cursor button 1104, an OK button 1105, a cancel button 1106, and an EPG button 1107. When the user presses down a button, the identifier of such pressed button is notified to the CPU 514.

The CPU 514 executes the program stored in the ROM 512. Following the instructions from such program to be executed, the CPU 514 controls the QAM demodulation unit 501, the QPSK demodulation unit 502, the QPSK modulation unit 503, the POD 504, the TS decoder 505, the display 509, the secondary storage unit 510, the primary storage unit 511, and the ROM 512.

Figure 12:
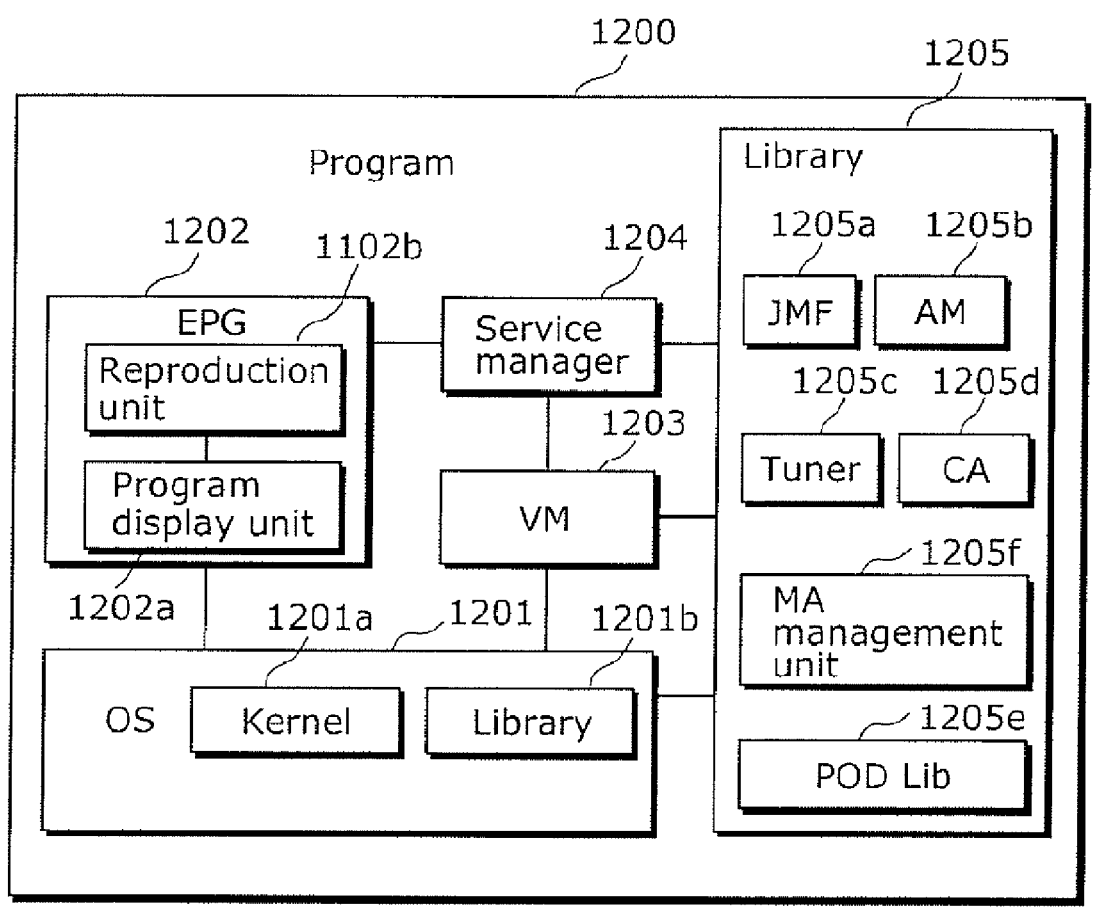
FIG. 12 is a structure diagram showing a structure of the program stored in a terminal apparatus according to the present invention.

FIG. 12 is an example of a structure diagram of a program stored in the ROM 512 and executed by the CPU 514.

A program 1200 is configured of plural subprograms, specifically, an OS 1201, an EPG 1202, a Java® VM 1203 (hereinafter referred to as VM 1203), a service manager 1204, and a Java® library 1205 (hereinafter referred to as library 1205).

The OS 1201 is a subprogram activated by the CPU 514 when power to the terminal apparatus 500 is turned on. The OS 1201 stands for operating system, an example of which is Linux and the like. The OS 1201 is made up of a kernel 1201a for executing a subprogram in parallel with another subprogram and of a library 1201b, and is a generic name for publicly known technology, and therefore detailed explanation is omitted. In the present embodiment, the kernel 1201a of the OS 1201 executes the EPG 1202 and the VM 1203 as subprograms. Meanwhile, the library 1201b provides these subprograms with plural functions required for controlling the constituent elements of the terminal apparatus 500.

Here, tuning is introduced as an example of such functions. In the tuning function, tuning information including a frequency is received from another subprogram and then passed over to the QAM demodulation unit 501. Accordingly, it is possible for the QAM demodulation unit 501 to perform demodulation based on the provided tuning information, and pass the demodulated data to the POD 504. As a result, the other subprograms can control the QAM demodulation unit via the library 1201b.

Figure 13A:
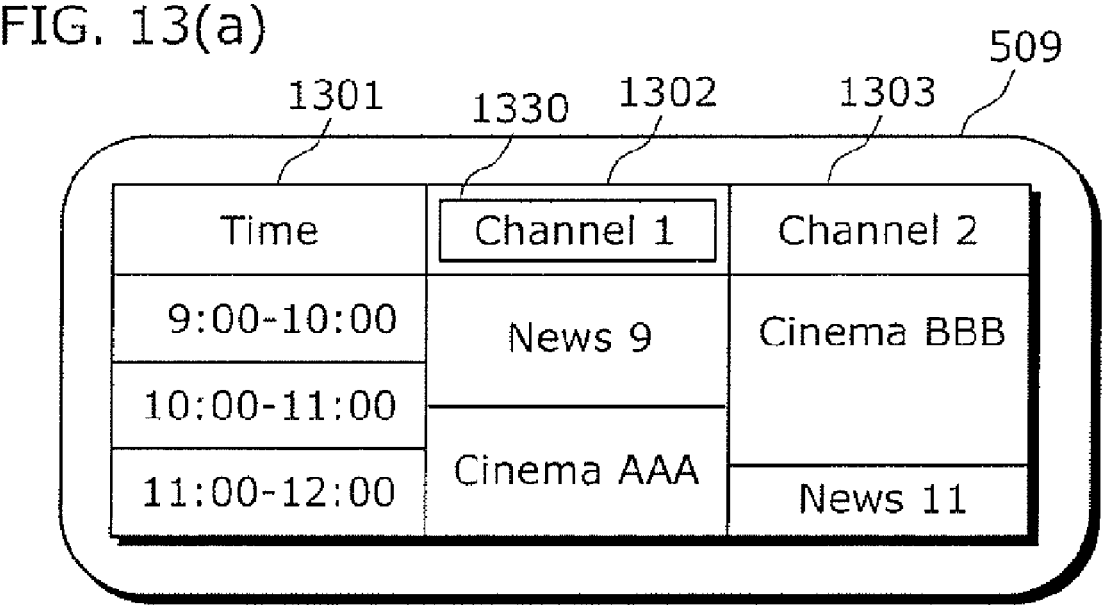
FIG. 13(a) shows an example of an on-screen display displayed by a display according to the present invention; (b) shows an example of an on-screen display displayed by the display according to the present invention.
Figure 13B:
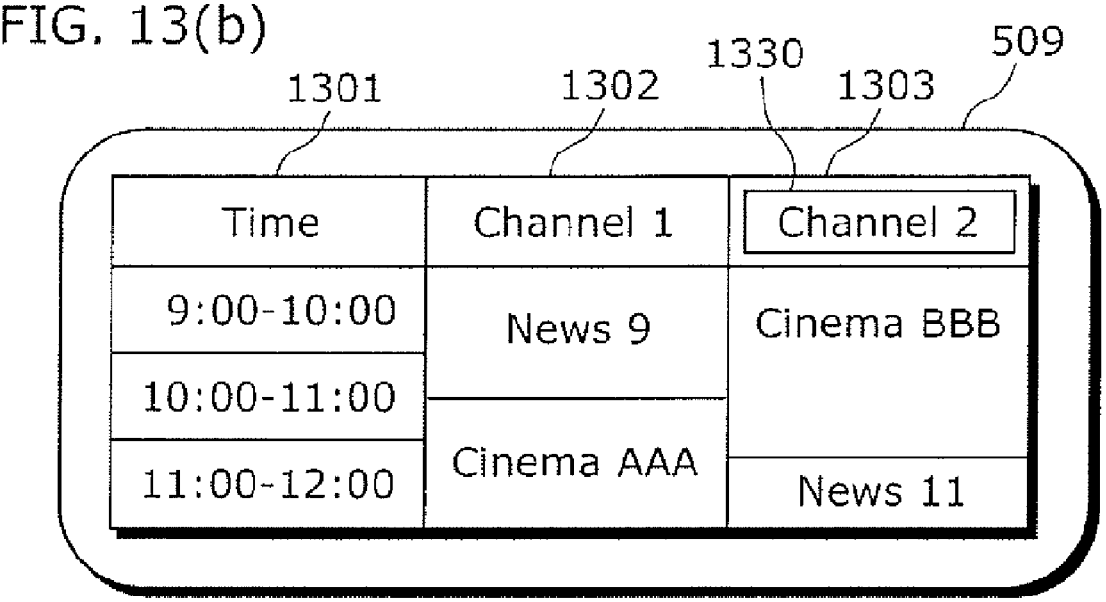

The EPG 1202 is made up of a program display unit 1202a for displaying a list of programs to the user as well as for accepting an input from the user, and a reproduction unit 1102b for selecting channels. Here, EPG is an abbreviation of Electric Program Guide. The EPG 1202 gets activated when power to the terminal apparatus 500 is turned on. In the activated EPG 1202, the program display unit 1202a waits for an input from the user via the input unit 513 of the terminal apparatus 500. Here, in the case where the input unit 513 takes the form of the front panel illustrated in FIG. 11, when the user presses down the EPG button 1107 on the input unit 513, the CPU 514 is notified of the identifier of such EPG button. The program display unit 1202a of the EPG 1202 which is a subprogram running on the CPU 514, accepts this identifier and shows program information on the display 509. FIG. 13(a) and FIG. 13(b) show examples of a program table displayed on the display 509. Referring to FIG. 13(a), the program information is displayed on the display 509 in a grid pattern. A column 1301 describes time information. A column 1302 describes a channel name "Channel 1" and programs to be broadcast during time periods corresponding to the respective times described in the column 1301. It is shown that a program "News 9" is broadcast from 9:00 to 10:30, and "Cinema AAA" is broadcast from 10:30 to 12:00 on "Channel 1". A column 1303 describes a channel name "Channel 2" and programs to be broadcast during time periods corresponding to the respective times described in the column 1301, as in the case of the column 1302. A program "Cinema BBB" is broadcast from 9:00 to 11:00, and "News 11" is broadcast from 11:00 to 12:00. 1330 is a cursor. The cursor 1330 moves at the press of the left-cursor 1103 or the right-cursor 1104 on the front panel 1100. When the right-cursor 1104 is pressed down in the state illustrated in FIG. 13(a), the cursor 1330 moves towards the right as shown in FIG. 13(b). Meanwhile, when the left-cursor 1103 is pressed down in the state illustrated in FIG. 13(b), the cursor 1330 moves towards the left as shown in FIG. 13(a).

When the OK button 1105 on the front panel 1100 is pressed down in the state shown in FIG. 13(a), the program display unit 1202a notifies the reproduction unit 1102b of the identifier of "Channel 1". Meanwhile, when the OK button 1105 on the front panel 1100 is pressed down in the state shown in FIG. 13(b), the program display unit 1202a notifies the reproduction unit 1102b of the identifier of "Channel 2".

Furthermore, the program display unit 1202a periodically stores program information to be displayed from the head end 101 into the primary storage unit 511 via the POD 504. Generally, it takes time to obtain program information from the head end. However, it becomes possible to quickly display a program table by displaying the program information that is pre-stored in the primary storage unit 511 at the press of the EPG button 1107 of the input unit 513.

The reproduction unit 1102b reproduces the channel using the received identifier of the channel. The relationship between channel identifiers and channels is pre-stored by the secondary storage unit 510 as channel information. FIG. 14 shows an example of the channel information stored in the secondary storage unit 510. The channel information is stored in tabular form. A column 1401 describes the identifiers of channels. A column 1402 describes channel names. A column 1403 describes tuning information. Here, the tuning information is represented by values to be provided to the QAM demodulation unit 501 such as frequency, transmission rate, and coding ratio. A column 1404 describes program numbers. Program numbers are numbers used to identify PMTs defined by the MPEG2 standard. A description about PMT is given later. Each of lines 1411-1414 indicates a set of the identifier, channel name, and tuning information of each channel. The line 1411 describes a set that includes "1" as an identifier, "Channel 1" as a channel name, a frequency of "150 MHz" as tuning information, and "101" as a program number. The reproduction unit 1102b passes the identifier of the received channel directly to the service manager in order to reproduce the channel.

Moreover, when the user presses down the up-cursor 1101 and the down-cursor 1102 on the front panel 1100 while the reproduction is taking place, the reproduction unit 1102b receives a notification about such press by the user from the input unit 513 via the CPU 514, and switches the channel being reproduced to another one. First, the reproduction unit 1102b stores, in the primary storage unit 511, the identifier of the channel that is currently being reproduced. FIG. 15(a), (b), and (c) show example identifiers of channels stored in the primary storage unit 511. FIG. 15(a) shows that an identifier "3" is stored, and it is shown by referring to FIG. 14 that a channel with the channel name "TV 3" is being reproduced. When the user presses down the up-cursor 1101 in a state illustrated in FIG. 15(a), the reproduction unit 1102b refers to the channel information shown in FIG. 14, and passes the identifier "2" of a channel with the channel name of "Channel 2" to the service manager in order to newly reproduce a channel with the channel name of "Channel 2", which is the previous channel in the table. At the same time, the reproduction unit 1102b rewrites the identifier into the channel identifier "2" stored in the primary storage unit 511. FIG. 15(b) shows such rewritten channel identifier. Meanwhile, when the user presses down the down-cursor 1102 in the state illustrated in FIG. 15(a), the reproduction unit 1102b refers to the channel information shown in FIG. 14, and passes the identifier "4" of a channel with the channel name of "TV Japan" to the service manager in order to newly reproduce a channel with the channel name of "TV Japan", which is the next channel in the table. At the same time, the reproduction unit 1102b rewrites the identifier into the channel identifier "4" stored in the primary storage unit 511. FIG. 15(c) shows such rewritten channel identifier.

The VM 1203 is a Java® virtual machine that sequentially analyzes and executes programs written in the Java® language. Programs written in the Java® language are compiled into intermediate codes known as byte codes which do not depend on hardware. The Java® virtual machine is an interpreter that executes such byte codes. Some of the Java® virtual machines translate the byte codes into an executable form which can be interpreted by the CPU 514 and pass the result to the CPU 514, which executes it. The VM 1203 gets activated, with a Java® program to be executed being specified by the kernel 1201a. In the present embodiment, the kernel 1201a specifies the service manager 1204 as a Java® program to be executed. A detailed commentary on the Java® language is given in many books such as "Java® Language Specification" (ISBN 0-201-63451-1). Here, detailed description shall be omitted. In addition, detailed commentary on the operation of the Java® VM itself is available in many books such as "Java® Virtual Machine Specification" (ISBN 0-201-63451-X). Here, detailed description shall be omitted.

The service manager 1204, which is a Java® program written in the Java® language, is executed by the VM 1203 sequentially. It is possible for the service manager 1204 to call and to be called by another subprogram not written in the Java® language through the JNI (Java®Native Interface). A commentary on the JNI is available in many books such as "Java® Native Interface". Therefore, detailed description shall be omitted here.

The service manager 1204 accepts the identifier of the channel from the reproduction unit 1102b through the JNI.

First, the service manager 1204 passes the identifier of the channel to a Tuner 1205c in the library 1205 so as to request for tuning. The Tuner 1205c refers to the channel information stored in the secondary storage unit 510 to obtain the tuning information. Assuming that the service manager 1204 passes the identifier "2" of the channel to the Tuner 1205c, the Tuner 1205c refers to the column 1412 shown in FIG. 14, and obtains the tuning information "156 MHz," corresponding to the channel. The Tuner 1205*c* passes the tuning information to the QAM demodulation unit 501 via the library 1201*b* of the OS 1201. The QAM demodulation unit 501 demodulates the signal sent from the head end 101 according to the tuning information given to the QAM demodulation unit 501, and passes the resultant signal to the POD 504.

Next, the service manager 1204 requests a CA 1205*b* inside the library 1205 to perform descrambling, The CA 1205*d* provides the POD 504 with information required for descrambling, through the library 1201*b* in the OS 1201. On the basis of such provided information, the POD 504 descrambles the signal provided by the QAM demodulation unit 501, and passes the result to the TS decoder 505.

Next, the service manager 1204 provides a JMF 1205*a* inside the library 1205 with the identifier of the channel, so as to request for the reproduction of the video and audio.

Figure 16:
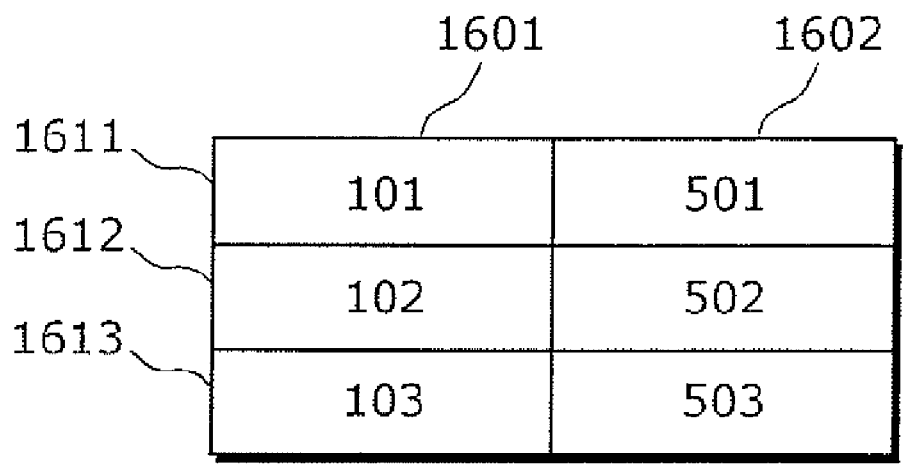
FIG. 16 is a schematic diagram showing the details of a PAT specified in the MPEG2 standard according to the present invention.
Figure 17:
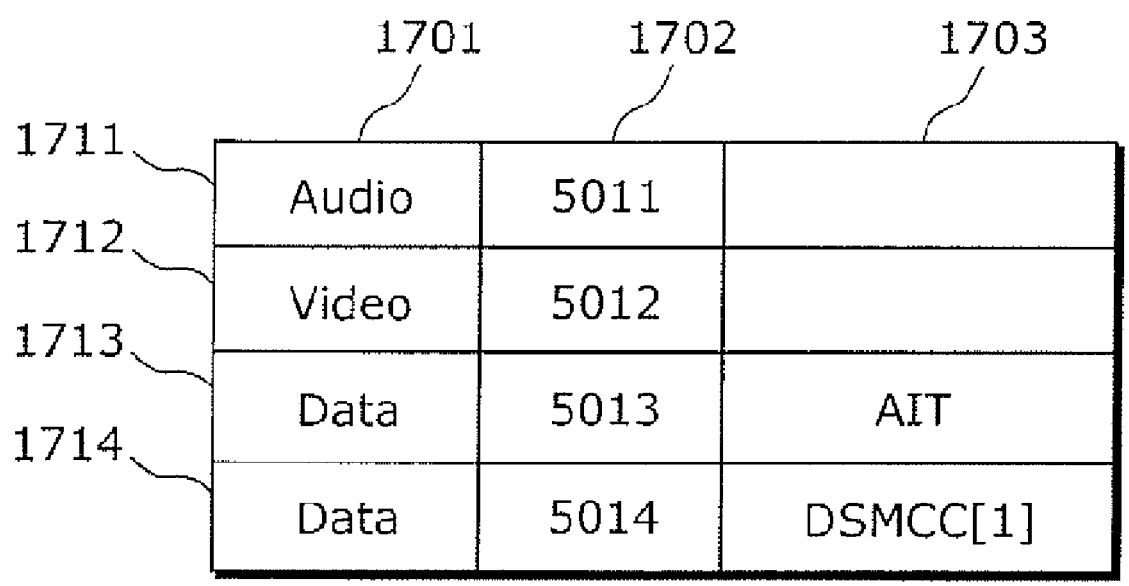
FIG. 17 is a schematic diagram showing the details of a PMT specified in the MPEG2 standard according to the present invention.

First, the JMF 1205*a* obtains, from a PAT and a PMT, packet IDs used to specify the video and audio to be reproduced. PAT and PMT are tables defined by the MPEG2 standard that show the program line-up included in an MPEG2 transport stream. PAT and PMT are carried in the payloads in packets included in an MPEG2 transport stream, together with audio and video. Refer to the specification for a detailed description of PAT and PMT. Here, only an overview of PAT and PMT is given. PAT, which is an abbreviation of Program Association Table, is carried in packets with the packet ID "0". In order to obtain the PAT, the JMF 1205*a* indicates, to the TS decoder 505, the packet ID "0" and the CPU 514 through the library 1201*b* of the OS 1201. Then, the TS decoder 505 performs filtering based on the packet ID "0", and passes the resultant to the CPU 514. Accordingly, the JMF 1205*a* can collect the PAT packets. FIG. 16 illustrates a table that schematically shows an example of the collected PAT information. A column 1601 describes program numbers. A column 1602 describes packet IDs. The packet IDs shown in the column 1602 are used to obtain the PAT. Each of lines 1611~1613 is a pair of the program number of a channel and a packet ID corresponding to it. Here, three channels are defined. The line 1611 defines a pair of the program number "101" and the packet ID "501". Assuming that the channel identifier provided to the JMF 1205*a* is "2", the JMF 1205*a* refers to the column 1412 in FIG. 14, so as to obtain the program number "102" corresponding to such channel identifier, and then refers to the column 1612 in the PAT shown in FIG. 16, so as to obtain the packet ID "502" corresponding to the program number "102". PMT, which is an abbreviation of Program Map Table, is carried in packets with the packet IDs specified in the PAT. In order to obtain the PMT, the JMF 1205*a* indicates, to the TS decoder 505, a packet ID and the CPU 514 through the library 1201*b* of the OS 1201. Here, a packet ID to be specified is "502". Then, the TS decoder 505 performs filtering based on the packet ID "502", and passes the resultant to the CPU 514. Accordingly, the JMF 1205*a* can collect the PMT packets. FIG. 17 illustrates a table that schematically shows an example of the collected PMT information. A column 1701 describes stream types. A column 1702 describes packet IDs. Information specified in the respective stream types is carried in the payloads of packets with the packet IDs specified in the column 1702. A column 1703 describes additional information. Each of columns 1711~1714 is a pair of a packet ID and the type of information being transmitted, which is known as an elementary stream. The column 1711, which is a pair of the stream type "audio" and the packet ID "5011", indicates that audio data is stored in the payload of the packet with the packet ID "5011". The JMF 1205*a* obtains, from the PMT, the packet IDs of the video and audio to be reproduced. Referring to FIG. 17, the JMF 1205*a* obtains the audio packet ID "5011" from the line 1711, and the video packet ID "5012" from the line 1712.

Then, the JMF 1205*a* provides the TS decoder 505 with pairs of the obtained audio packet ID and the audio decoder 506 as an output destination as well as the video packet ID and the video decoder 508 as an output destination, via the library 1201*b* of the OS 1201, The TS decoder 505 performs filtering based on such provided packet IDs and the output destinations. Here, the packet with the packet ID "5011" is passed to the audio decoder 506 and the packet with the packet ID "5012" is passed to the video decoder 508. The audio decoder 506 performs digital-to-analog conversion on the provided packet, so as to reproduce the audio via the speaker 507. The video decoder 508 performs digital-to-analog conversion on the provided packet, so as to display the video on the display 509.

Finally, the service manager 1204 provides the channel identifier to an AM 1205*b* in the library 1205, so as to request for data broadcast reproduction. Here, data broadcast reproduction means to extract a Java® program included in the MPEG2 transport stream and cause the VM 1203 to execute it. As a technique for embedding a Java® program into an MPEG2 transport stream, a method known as DSMCC, described in the MPEG specification ISO/IEC13818-6, is used. Detailed explanation of DSMCC is omitted here. DSMCC specification defines a method of encoding a file system comprised of directories and files used by a computer, in packets within an MPEG2 transport stream. Information about the Java® program to be executed is carried in packets in the MPEG2 transport stream in the form of AIT. AIT is an abbreviation of Application Information Table, and is defined in the OCAP 1.0 specification (formally known as OCAP 1.0 Profile OC-SP-OCAP1.0-IF-109-031121).

First, in order to obtain the AIT, the AM 1205*b* obtains the PAT and PMT as in the case of the JMF 1205*a*, so as to obtain the packet ID of the packet that stores the AIT. Assuming that "2" is the provided channel identifier and that the PAT shown in FIG. 16 and the PMT shown in FIG. 17 are being transmitted, the AM 1205*b* obtains the PMT shown in FIG. 17 according to the same procedure followed by the JMF 1205*a*. Subsequently, the AM 1205*b* extracts, from the PMT, the packet ID of the elementary stream whose stream type is "Data" and which has "AIT" as additional information. As shown in FIG. 17, the elementary stream in the line 1713 corresponds to such elementary stream, and therefore the AM 1205*b* obtains the packet ID "5013" from it.

Figures 18, 19:
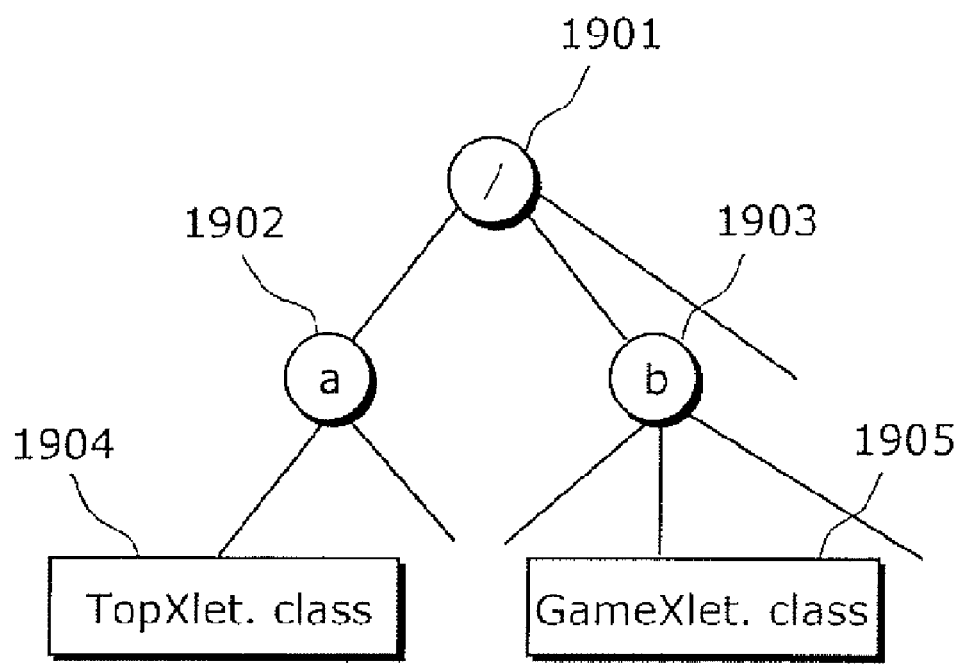
FIG. 18 is a schematic diagram showing the details of an AIT specified in OCAP 1.0 specification according to the present invention.
FIG. 19 is a schematic diagram showing the file system transmitted in the DSMCC format according to the present invention.

The AM 1205*b* provides the TS decoder 505 with the packet ID of the AIT and the CPU 514 as an output destination, through the library 1201*b* of the OS 1201. Then, the TS decoder 505 performs filtering based on such provided packet ID, and passes the resultant to the CPU 514. Accordingly, the AM 1205*b* can collect the packets of AIT. FIG. 18 is a table that schematically shows an example of the collected AIT information. A column 1801 describes identifiers of Java® programs (noted as a program identifier in the diagram). A column 1802 describes control information for controlling the Java® programs. The control information includes "autostart", "present", and "kill". "autostart" means that the terminal apparatus 500 automatically executes the program promptly. "present" means that the program is not executed automatically. "kill" means that the program is to be terminated. A column 1803 describes DSMCC identifiers used to extract packet IDs that include Java® programs in the DSMCC format. A column 1804 describes program names of the Java® programs. Each of columns 1811 and 1812 is a set of information regarding a Java® program. The Java® program defined in the column 1811 is a set of an identifier "301", control information "autostart", a DSMCC identifier "1", and a program name "a/TopXlet". The Java® program defined in the column 1812 is a set of an identifier "302", control information "present", a DSMCC identifier "1"; and a program name "b/GameXlet". Here, these two Java® programs have the same DSMCC identifier. This indicates that two Java® programs are included in the file system which has been encoded according to the same DSMCC method, Here, only four items of information are specified for the respective Java® programs, but more items of information are specified in actuality. Refer to the OCAP 1.0 specification for details.

The AM 1205b finds the "autostart" Java®program from the AIT, and extracts the corresponding DSMCC identifier and Java® program name. Referring to FIG. 18, the AM 1205b extracts the Java® program in the line 1811, and obtains the DSMCC identifier "1" and the Java® program name "a/TopXlet".

Next, the AM 1205b obtains, from the PMT, the packet ID of packets that store Java® programs in the DSMCC format, using the DSMCC identifier obtained from the AIT. More specifically, the AM 1205b obtains, from the PMT, the packet ID included in the elementary stream whose stream type is "Data" and whose DSMCC identifier in the additional information matches.

Here, assuming that such DSMCC identifier is "1" and the PMT is that shown in FIG. 17, the elementary stream in the line 1714 satisfies the above condition. Therefore, the packet ID "5014" is to be extracted.

The AM 1205b indicates, to the TS decoder 505, the packet ID of packets in which data is embedded in the DSMCC format as well as the CPU 514 as an output destination through the library 1201b of the OS 1201. Here, the packet ID "5014" is provided. Then, the TS decoder 505 performs filtering based on the provided packet ID, and passes the resultant to the CPU 514. Accordingly, the AM 1205b can collect the required packets. The AM 1205b reconstructs the file system from the collected packets according to the DSMCC method, and stores the reconstructed file system into the primary storage unit 511. The process for extracting data such as the file system from packets in the MPEG2 transport and storing the extracted data into storage units such as the primary storage unit 511 is hereinafter referred to as download.

FIG. 19 shows an example of the downloaded file system. In the diagram, circles represent directories and squares represent files, where 1901 is a root directory, 1902 is a directory "a", 1903 is a directory "b", 1904 is a file "TopXlet.class", and 1905 is a file "GameXlet.class".

Subsequently, the AM 1205b passes, to the VM 1203, a Java® program to be executed out of the file system downloaded into the primary storage unit 511. Here, assuming that the Java® program name to be executed is "a/TopXlet", a file "a/TopXlet.class", resulting from the appendage of ".class" to the above Java® program name, is a file to be executed. "/" is a delimiter between a directory and a file name, and as shown in FIG. 19, the file 1904 is a Java® program to be executed. Next, the AM 1205b passes the file 1904 to the VM 1203.

The VM 1203 executes such received Java® program.

Upon receiving the identifier of another channel, the service manager 1204 stops the reproduction of the video and audio as well as the execution of the Java® program which are being carried out through each library included in the library 1205, likewise through each library included in the same library 1205, and then performs the reproduction of the video and audio as well as the execution of a Java® program in accordance with the newly received channel identifier.

The library 1205 is a collection of plural Java® libraries stored in the ROM 512. In the present embodiment, the library 1205 includes the JNF 1205a, the AN 1205b, the Tuner 1205c, the CA 1205d, a POD Lib 1205e, MA management unit 1205f, and the like.

It is mentioned that the initialization subprogram 802 performs the activation of a privileged program based on special program information transmitted by the head end 101. Details of this shall be described.

The OCAP 1.0 specification stipulates a procedure in which a privileged program (hereinafter referred to as a monitor application) is downloaded from a source outside the terminal apparatus and executed in place of a program provided beforehand in the terminal such as the EPG 1202. As a function of the monitor application, for example, there is the displaying of an electronic program guide. In addition, it is stipulated that, in the case where it is specified that a monitor application exists and that it should automatically activate, the monitor application must be executed. Here, details are omitted, and only the areas relevant to the present invention shall be discussed.

Figures 20, 21:
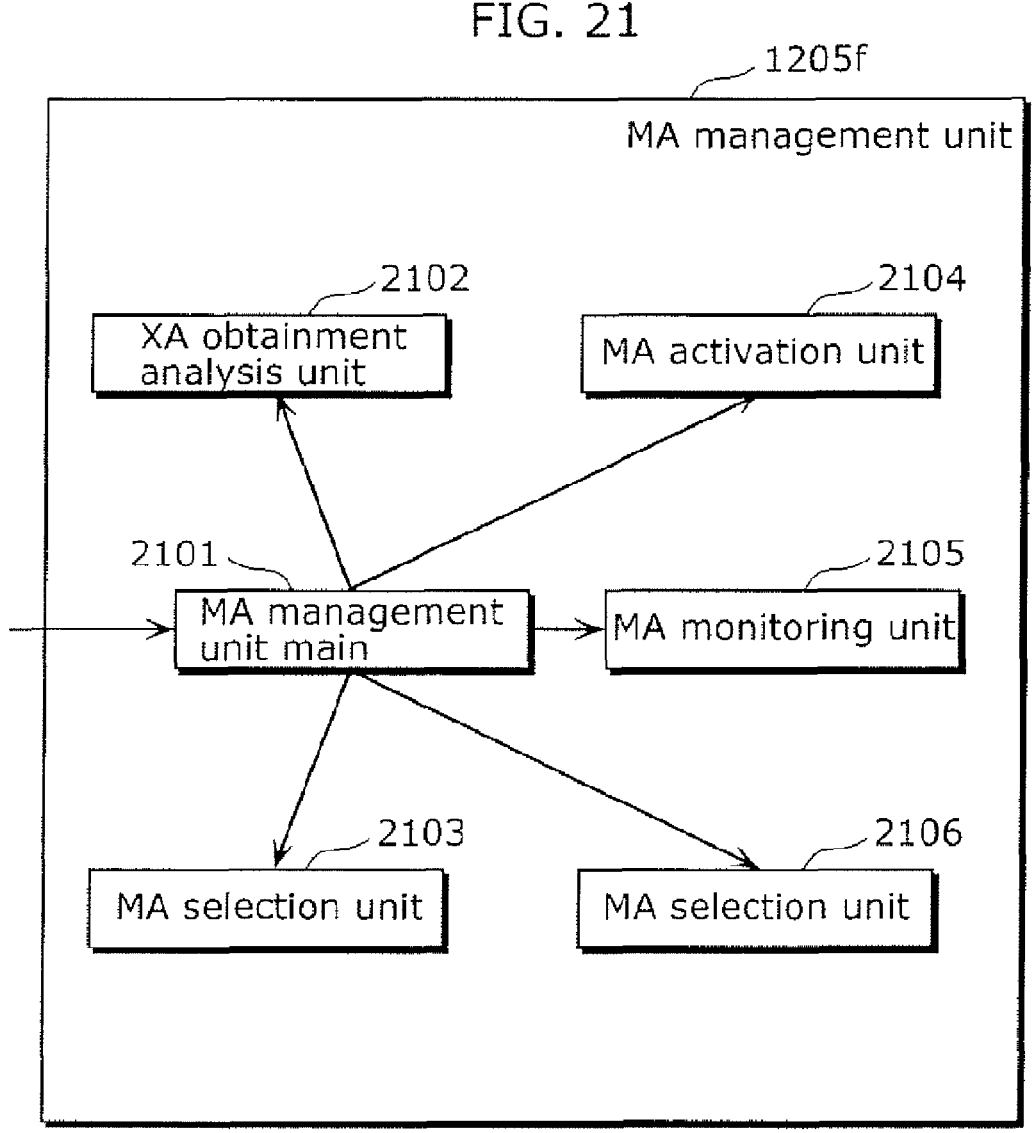
FIG. 20 is a schematic diagram showing details of the XAIT according to the present invention.
FIG. 21 is a configuration diagram of the MA management unit according to the present invention.

FIG. 20 is a table that schematically represents an example of special program information (hereinafter referred to as XAIT) to be transmitted from the head end 101. As the XAIT adopts a structure similar to that of the AIT shown in FIG. 18, the same constituent elements are assigned the same reference numbers, and their description shall be omitted. A column 2005 describes a monitor application identifier. Unlike the processing of the AIT in the AM 1205b, only programs having a monitor application identifier of 1 or higher, for example, are treated as a monitor application. In the case where there are plural programs having a monitor application identifier of 1 or higher in the XAIT, all such programs are treated as monitor applications. Details shall be discussed later.

Note that although it is mentioned that only those having a monitor application identifier of 1 or higher are treated as monitor applications, it is also possible to determine whether or not a program shall be handled as a monitor application, according to a different condition.

The initialization subprogram 802 performs the activation of a special program based on special program information transmitted from the head end 101, by instructing the activation of the monitor application to the MA management unit 1205f.

FIG. 21 is a block diagram showing an example of the structure of the MA management unit 1205f.

The MA management unit 1205f includes an MA management unit main 2101, an XAIT obtainment analysis unit 2102, an MA selection unit A 2103, an MA activation unit 2104, an MA monitoring unit 2105, and an MA selection unit B 2106.

The MA management main 2101 plays the central role in the MA management unit 1205f and implements the functions of the MA management unit 1205f by receiving an instruction from the initialization subprogram 802 and using the other constituent elements within the MA management unit 1205f.

The XAIT obtainment analysis unit 2102 analyzes, according to an instruction from the MA management unit main 2101, an XAIT sent from the head end 101 and returns the analysis result to the MA management unit main 2101. For example, the details shown in FIG. 20 are returned as the analysis result.

The MA selection unit A 2103 selects the monitor application to be activated based on the XAIT analysis result passed on from the MA management unit main 2101, and returns the result to the MA management unit main 2101. For example, in the case where the details in FIG. 20 are given as the XAIT analysis result, the MA selection unit A 2103 may select the program indicated in row 1811, as the monitor application to be activated.

The MA activation unit 2104 performs the activation of the monitor application specified by the MA management unit main 2101. For example, in the case where the program shown in row 1811 in FIG. 20 is specified, it activates "/a/ MA1" as the monitor application. Description of the activation method shall be omitted as it is the same as in the operation of the AM 1205b.

The MA monitoring unit 2105 monitors the operational state of the monitor application specified by the MA management unit main 2101 and, in the case where abnormal termination occurs, notifies such fact to the MA management unit of main 2101. As a technique for recognizing the occurrence of an abnormal termination, the judgment for such can be made, for example, by receiving exceptions sent out by the monitor application. Since exceptions are defined in the Java® language specification, description shall be omitted. Furthermore, it is also possible to have the MA monitoring unit 2105 monitor plural monitor applications at the same time.

The MA selection unit B 2106 selects an alternative application according to an instruction from the MA management unit main 2101, and returns the selection result to the MA management unit main 2101.

Figure 22:
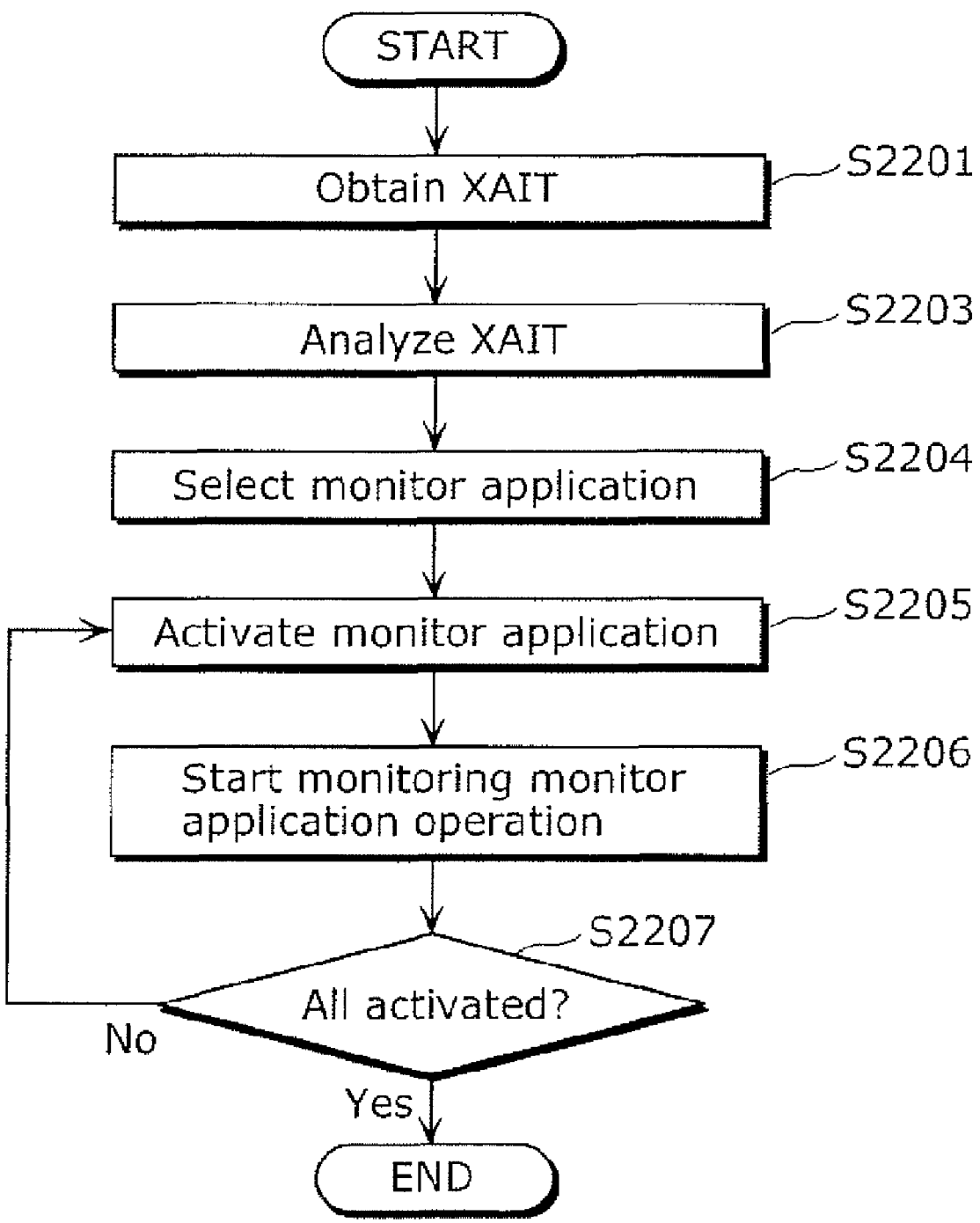
FIG. 22 is a flowchart showing the operation when the MA management unit performs the activation of a monitor application in the first embodiment.

FIG. 22 is a flowchart showing the procedure for the monitor application activation performed by the MA management unit 1205f When the MA management unit main 2101 receives the instruction from the initialization subprogram 802, first, the MA management unit main 2101 outputs an XAIT analysis instruction to the XAIT obtainment analysis unit 2102, and the XAIT obtainment analysis unit 2102 attempts to obtain the XAIT being sent from the head end 101 (S2201). In addition, the XAIT obtainment analysis unit 2102 analyzes the XAIT (S2203), and returns the analysis result to the MA management unit main 2101. When, based on the analysis result, the MA management unit main 2101 requests the MA selection unit A 2103 to select a monitor application, the MA selection unit A 2103 selects the monitor application to be activated, based on the information forwarded by the MA management unit main 2101, and returns the selection result to the MA management unit main 2101 (S2204). Note that in the case where the XAIT obtainment or analysis fails in S2201 or in S2203, the MA selection unit A 2103 returns an alternative program (for example, the EPG 1202) to the MA management unit main 2101, as the selection result. When, based on the result returned by the MA selection unit A 2103, the MA management unit main 2101 instructs the MA activation unit 2104 to activate the monitor application, the MA activation unit 2104 activates the monitor application instructed by the MA management unit main 2101 (S2205). When, in addition, the MA management unit main 2101 instructs the MA monitoring unit 2105 to monitor the operational state of the monitor application activated by the MA activation unit 2104, the MA monitoring unit 2105 starts the monitoring of the operational state of the instructed monitor application (S2206). In addition, in the case where plural monitor applications are selected in S2204, the MA management unit main 2101 selects, from among such monitor applications, a monitor application whose activation has not yet been instructed to the MA activation unit 2104, and likewise attempts the activation and monitoring of the monitor application (S2207). When the MA management unit main 2101 completes the giving of activation and monitoring instructions for all monitor applications selected in S2204, the process with regard to monitor application activation is completed. Furthermore, in the case where a monitor application to be activated is not selected in S2204, the MA management unit main 2101 may perform the processes from S2205 onward, with an alternative program (for example, the EPG 1202) being selected.

Here, the process in the case where the activated monitor application abnormally terminates at an unforeseen timing shall be described, The OCAP 1.0 specification stipulates that, in the case where the monitor application abnormally terminates, the re-activation of such monitor application shall be attempted. However, based on the actual experience of abnormal termination, the re-occurrence of abnormal termination after the re-activation can be fairly expected.

In light of this, the present invention describes a method in which an alternative program is executed in place of the monitor application that is expected to abnormally terminate.

Note that although it is preferable that the normal operation of the alternative program is guaranteed (in other words, abnormal termination does not occur), implementation is possible even when such is not guaranteed.

Figure 23:
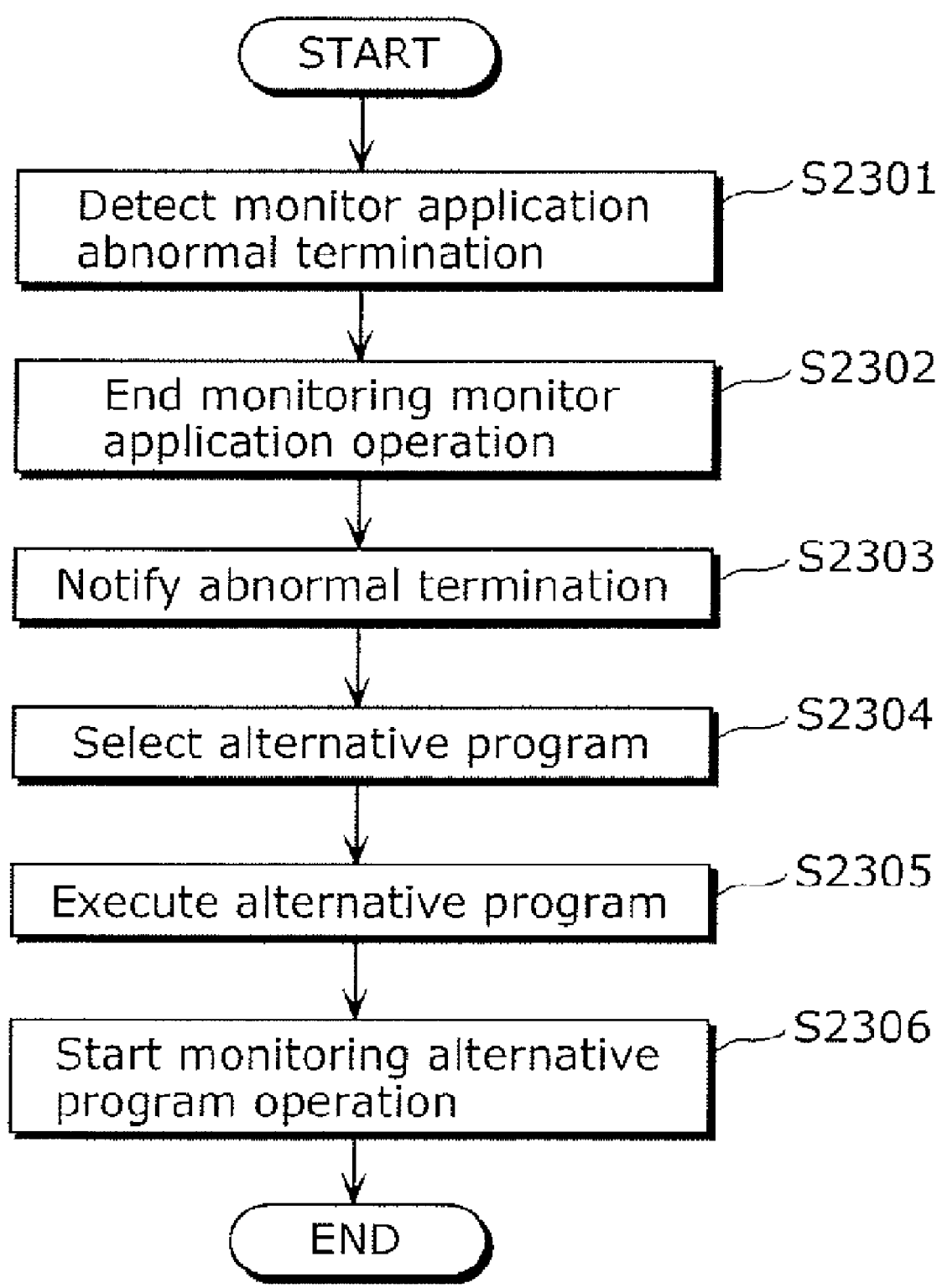
FIG. 23 is a flowchart showing the operation when the activated monitor application abnormally terminates at an unforeseen timing, in the first embodiment.

FIG. 23 is a flowchart showing the process in the case where the activated monitor application abnormally terminates at an unforeseen timing.

When the MA monitoring unit 2105 detects the abnormal termination of the currently monitored monitor application (S2301), the MA monitoring unit 2105 ends the monitoring of the abnormally terminated monitor application (S2302), and notifies the occurrence of the abnormal termination to the MA management unit main 2101 (S2303).

Upon receiving the notification regarding the abnormal termination from the MA monitoring unit 2105, the MA management unit main 2101 requests the selection of an alternative program to the MA selection unit B 2106. In accordance with the request from the MA management unit main 2101, the MA selection unit B 2106 selects an alternative program and returns, to the MA management unit main 2101, information necessary for the activation of the alternative program (S2304). The information necessary for the activation of the alternative program are, for example, the name of the program, the location at which the program is stored, and the like.

Based on the information returned by the MA selection unit B 2106, the MA management unit main 2101 instructs the activation of the alternative program to the MA activation unit 2104 (S2305).

The MA management unit main 2101 requests the MA monitoring unit 2105 to monitor the operational state of the alternative program (S2306).

In addition, in the case where the alternative program abnormally terminates, the next alternative program is selected and activated in the same procedure (S2301 to S2306) as in the case where the previously mentioned monitor application abnormally terminated.

Furthermore, in the result in S2303, the MA management unit main 2101 need not necessarily perform the alternative program activation process (in other words, S2304 onward). For example, in the case where plural monitor applications are selected in S2204 in FIG. 22 and as a result plural monitor applications are activated, it is possible to have the MA management unit main 2101 perform the alternative program activation process (in other words S2304 onward) only in the case where all of such monitor applications abnormally terminate.

In addition, it is also possible to have the alternative program activation process take place only in the case where a specific monitor application abnormally terminates. The specific monitor application is, for example, the monitor application in column 2005 in FIG. 20, specified by the monitor application identifier 1. In this case, even when the monitor application specified by the monitor application identifier 2 abnormally terminates, the alternative program activation process does not have to be carried out. Furthermore, in this case, implementation is also possible even when the process in S2206 (in other words, the operational state monitoring) in FIG. 22 is not carried out for the monitor application which does not have a monitor application identifier of 1.

Note that, although the EPG 1202 was mentioned as an example of the alternative program, another program can also be used as the alternative program, for as long as activation is possible. For example, implementation is still possible even with a program which re-starts the terminal apparatus or a program which only performs simple switching of channels, as an alternative program. Furthermore, the alternative program may specify the information of a program to the MA management unit main 2101 so that requesting the activation of another alternative program is made possible. For example, it is possible for the alternative program to instruct the re-activation of the monitor application which abnormally terminated earlier, and subsequently, the monitor application is activated.

Moreover, although the EPG 1202, which is the example of the alternative program, is described as being previously provided in the terminal apparatus, the present invention can also be implemented even without such previous preparation. For example, in the alternative program activation stage, it is also possible to download from an external source and activate the downloaded program. For example, the alternative program may be downloaded via a network, or downloaded from within an MPEG stream received by the terminal apparatus. With this, a program which is not previously provided can be activated as the alternative program.

Note that, although it is mentioned that the monitor application is downloaded and executed, the present invention may also be implemented even in the case where the monitor application is stored in the secondary storage unit 705 during the first downloading and, from the second time onward, the monitor application stored in the secondary storage unit 705 is used in place of downloading.

Figure 24:
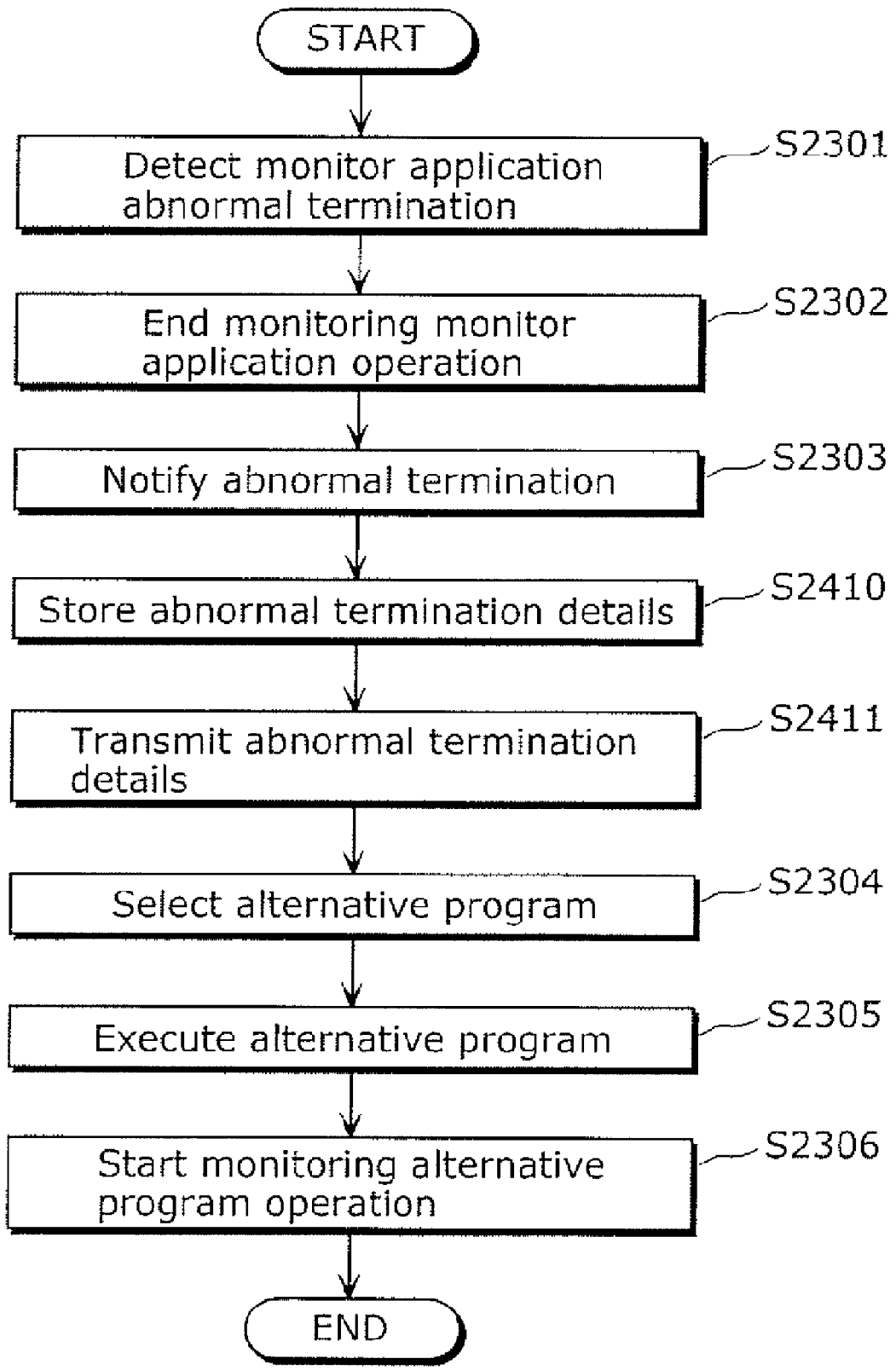
FIG. 24 is a flowchart showing the operation when, in the case where a monitor application abnormally terminates, the MA management unit stores and transmits the details of the abnormal termination, in the first embodiment.

Note that, although description is carried out for the case where the MA selection unit B 2106 selects the EPG 1202 as the alternative program, implementation is possible as long as long as it is possible to select, using an arbitrary selection method, an arbitrary program that is capable of being activated, In addition, it is possible, in the case where the monitor application abnormally terminates, to have the MA management unit 1205*f* store the details of the abnormal termination in the primary storage unit 511 or the secondary storage unit 510. In addition, the stored details may also be transmitted to a destination outside of the terminal apparatus. Although the details to be stored are, for example, the time at which the abnormal termination occurred, the Java® program identifier, the program name, the type of the abnormal termination (for example, insufficient memory), and so on, implementation is possible as long as it is information which at least allows the distinguishing of the occurrence of the abnormal termination. Furthermore, examples of the destination outside of an information terminal are the terminal apparatus manufacturer and the broadcast operator. As such, by transmitting to the terminal apparatus manufacturer in the case where abnormal termination occurs due to a malfunction in the terminal apparatus, the terminal apparatus manufacturer can immediately implement a countermeasure. Also, by transmitting to the broadcast operator in the case where the occurrence is caused by a malfunction in the monitor application, it becomes possible to immediately correct the malfunction in the monitor application. The process in this case is shown in FIG. 24. Moreover, in FIG. 24, parts having processes which are the same as in FIG. 23 are assigned the same reference numbers, and their description shall be omitted.

When the MA management unit main 2101 detects an abnormal termination of the monitor application according to S2303 in FIG. 24, the MA management unit main 2101 stores the details of the abnormal termination into the primary storage unit 511 or the secondary storage unit 510 (S2410). In addition, MA management unit main 2101 transmits the stored details to a destination outside the terminal apparatus. Subsequently, the MA management unit main 2101 continues with the processes from S2304 onward.

Moreover, with regard to the transmission means, any implementation is possible as long as it allows the communication of information to the outside of the terminal apparatus. For example, it is possible to transmit the stored details using FTP and E-mail which are commonly known technology.

Moreover, implementation is also possible using a removable storage device as the secondary storage apparatus. In this case, it is also possible to have an implementation in which transmission to the outside is not performed, and the removable storage device is transported using some means of transportation.

Moreover, in the present embodiment, it is also becomes possible to eliminate the ROM 512 by storing the details stored by the ROM 512 in the secondary storage unit 510. Furthermore, it is also possible to have the secondary storage unit 510 as being made up of plural sub-secondary storage units, with each of the sub-secondary storage units storing different information. For example, it is possible to have a detailed division in which, for example, one of the sub-secondary storage unit stores only tuning information, another sub-secondary storage unit stores the library 1201*b* of the OS 1201, and yet another sub-secondary storage unit stores a downloaded Java® program, and so on.

Furthermore, although in the present embodiment, the registered Java® program is stored in the secondary storage unit 510, it may also be stored in the primary storage unit 511. In the case of storing in the primary storage unit 511, all stored information is lost when the power is turned OFF.

Second Embodiment

The first embodiment describes the case where the MA is selection unit B 2106 selects the EPG 1202 as the alternative program. The present embodiment describes the case where, as a different selection method, the MA selection unit B 2106 once again selects the same program as that in the selection result from the MA selection unit A 2103 (in other words the program that has abnormally terminated).

This is the case where, even when a monitor application abnormally terminates, the same monitor application is re-activated by the MA management unit 1205*f* according to some basis for judgment. Such basis for judgment, for example, is when a countermeasure for the cause of the abnormal termination is known in advance and, by implementing the countermeasure after the abnormal termination, normal operation can be expected after re-activation. The countermeasure, for example, in the case where the monitor application abnormally terminates due to insufficient memory, is the securing of memory capacity that can be used by the monitor application, by the termination of other programs.

In the present embodiment, during the occurrence of the abnormal termination of the memory application, the MA monitoring unit 2105 notifies the MA management unit main 2101 of the occurrence of the abnormal termination, as well as, for example, a code indicating the cause of the abnormal termination of the monitor application. The MA management unit main 2101 previously holds, in a table or the like, countermeasures corresponding to codes (cause of the abnormal termination), and determines the countermeasure corresponding to the notified code and implements the determined countermeasure.

Figure 25:
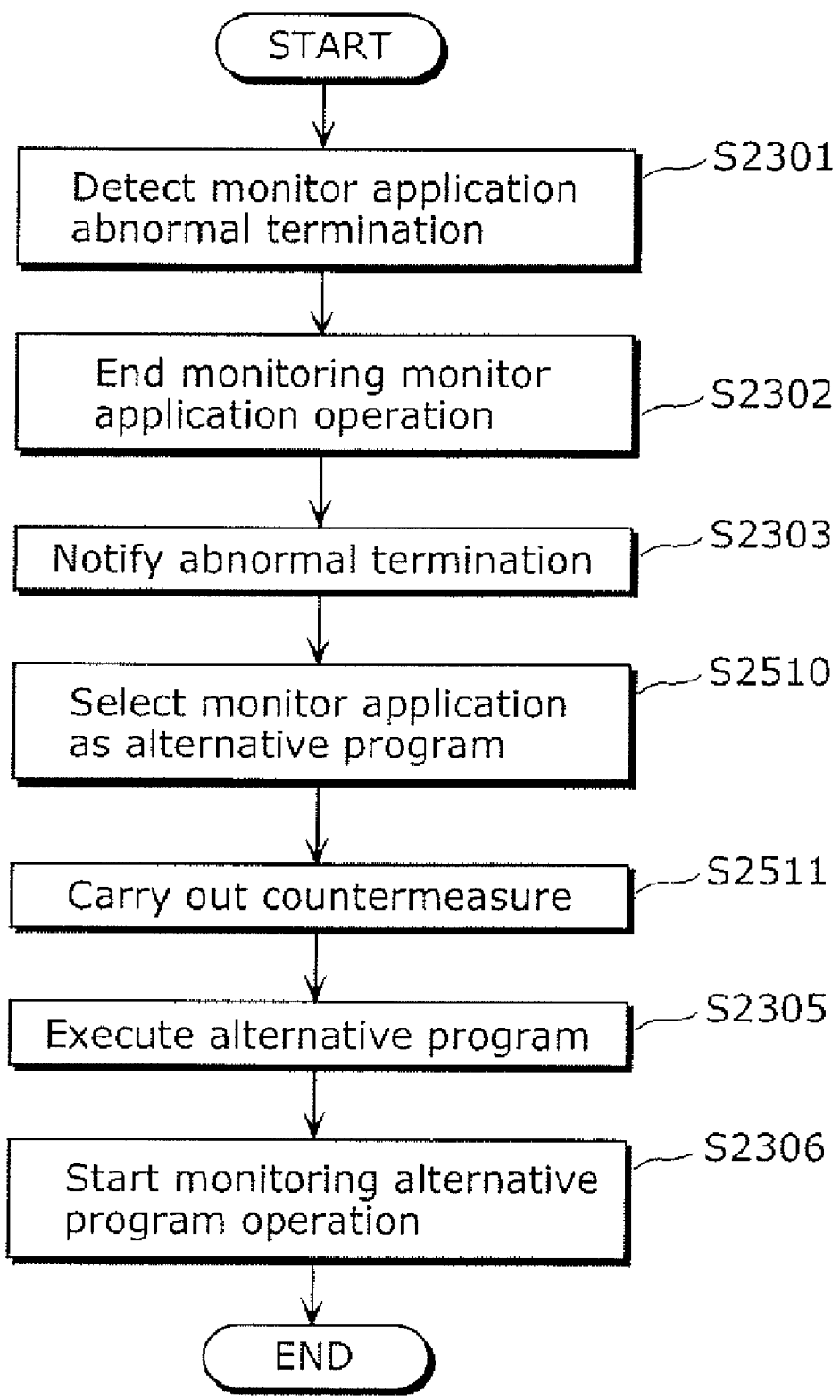
FIG. 25 is a flowchart showing the operation when an MA selection unit B re-selects the same program as the selection result of an MA selection unit A, in the second embodiment.

FIG. 25 shows the operational procedure in the present embodiment.

In FIG. 25, the parts that are the same as in FIG. 23 are assigned the same reference numbers, and their description is omitted.

Figure 26A:
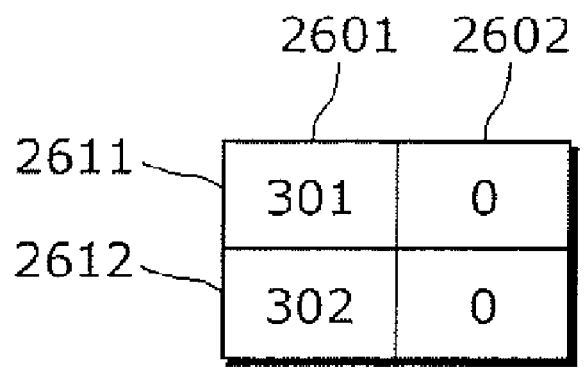
FIG. 26(a) is a diagram schematically representing the data stored in the primary storage unit, in the second embodiment; (b) is a diagram schematically representing the data stored in the primary storage unit, in the second embodiment; (c) is a diagram schematically representing the data stored in the primary storage unit, in the second embodiment.
Figure 26B:
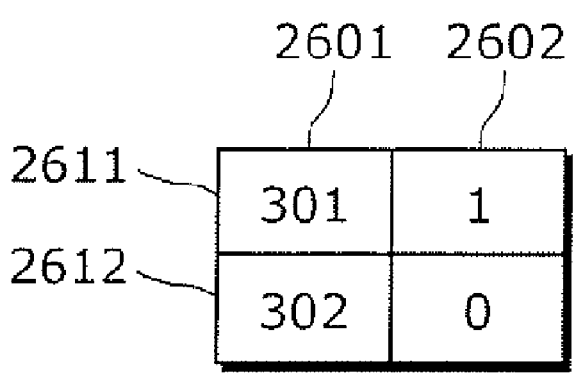
Figure 26C:
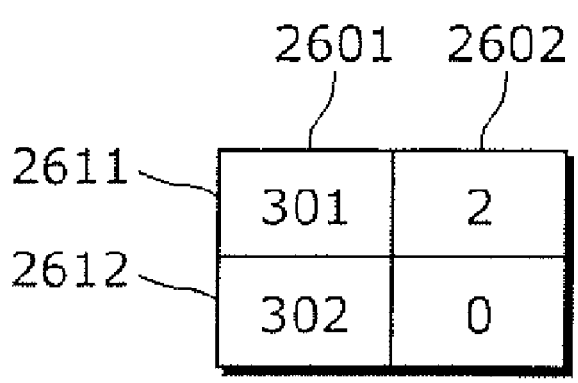

In S2303, the MA monitoring unit 2105 notifies the occurrence of the abnormal termination of the monitor application, as well as the code indicating the cause of the abnormal termination of the monitor application, to the MA management unit main 2101. Then, when the MA management unit main 2101 requests the MA selection unit B 2106 to select an alternative program, the MA selection unit B 2106 selects, as the alternative program, the monitor application which abnormally terminated, and returns information necessary for the activation of the monitor application to the MA management unit main 2101 (S2510). The information necessary for the activation of the monitor application is the information returned in S2204 in FIG. 22, or a part thereof, and additional information. Additional information is, for example, the number of times the selected monitor application has abnormally terminated, and the number of times the monitor application has been selected as an alternative program. In this case, in order to store the number of times the monitor application has abnormally terminated, the MA selection unit B 2106 stores such information in the primary storage unit 511 for example. FIG. 26(*a*), (*b*) and (*c*) are tables schematically representing the data stored in the primary storage unit 511. A column 2601 is a Java® program identifier, a column 2602 is the number of times the program indicated by the Java® program identifier has abnormally terminated. A row 2611 and a row 2612 are the set of Java® program information. For example, referring to FIG. 26(*a*), the Java® program in row 2611 is defined by the set of the identifier "301" and the number of program abnormal terminations "0". The Java® program in row 2612 is defined by the set of the identifier "302" and the number of program abnormal terminations "0".

FIG. 26(*a*) shows the details held prior to the process in S2302 in FIG. 23. In S2303 in FIG. 25, in the case where it is notified that the monitor application having the Java® identifier 301 has abnormally terminated, the data held in the primary storage unit 511 changes to that shown in FIG. 26(*b*). Note that implementation is also possible even without additional information.

The MA management unit main 2101 determines the countermeasure corresponding to the notified code, and implements the determined countermeasure for the cause of the abnormal termination (S2511). Subsequently, the processes from S2305 onward are carried out.

With this procedure, after the abnormal termination of the monitor application, it is possible to once again activate the same monitor application.

Third Embodiment

The second embodiment describes the case where, as an example, the MA selection unit B 2106 once again selects the same program as that in the selection result from the MA selection unit A 2103 (in other words the program that has abnormally terminated). In the present embodiment, as a different selection method, it is possible to have the MA selection unit B 2106 once again select the same program as that in the selection result from the MA selection unit A 2103 (in other words, the program that abnormally terminated) up to the Nth abnormal termination, and select another program (for example the EPG 1202) from the N+1th time onward.

Here, description shall be carried out for the case where N=2 times, and an alternative program is selected when the monitor application having the Java® program identifier 301 abnormally terminates.

Figure 27:
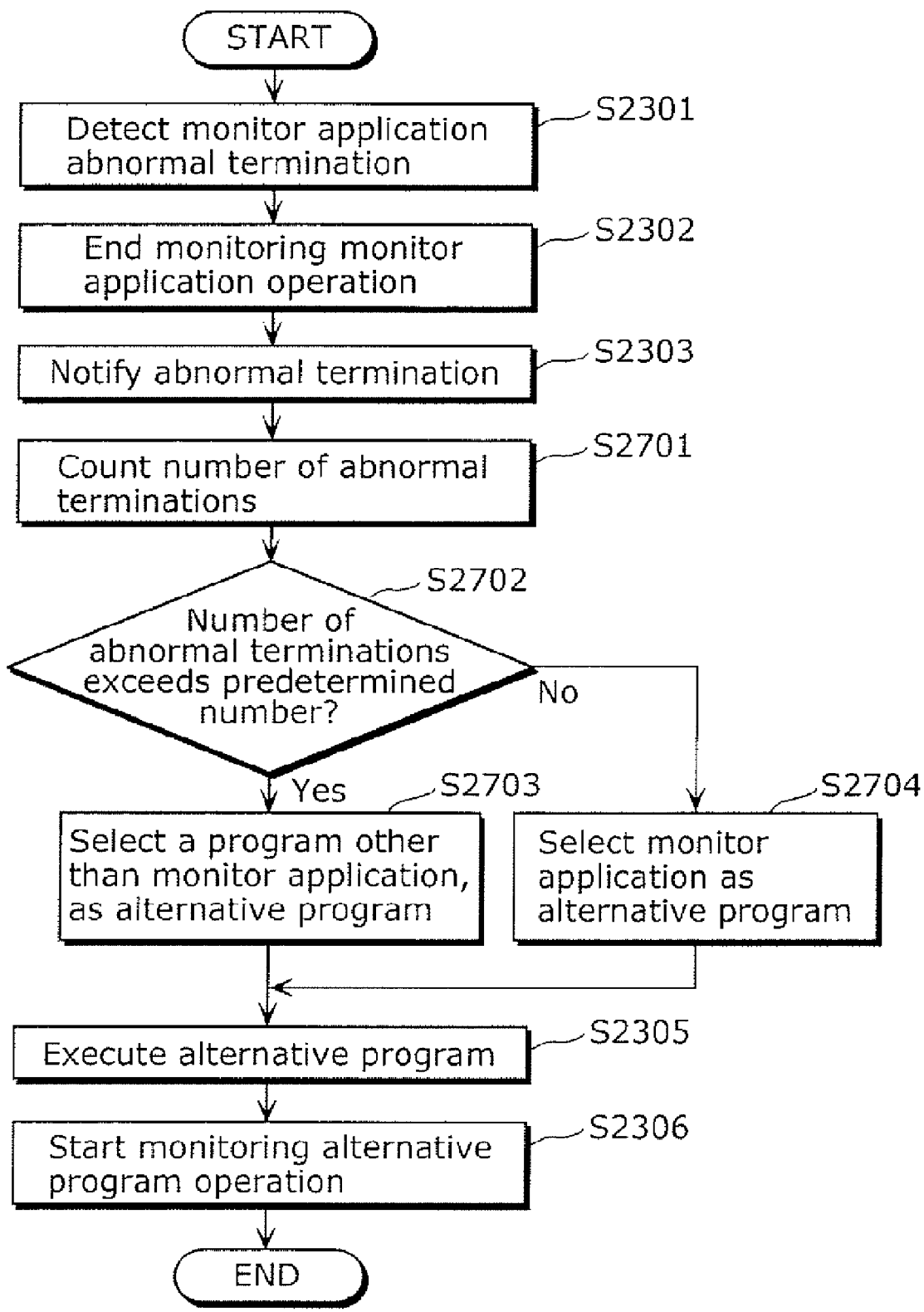
FIG. 27 is a flowchart showing the operation when the MA selection unit B re-selects the same program as the selection result of the MA selection unit A 2103 up to the Nth time and selects a different program from the N+1th time onward, in the third embodiment.

FIG. 27 is a flowchart showing the operational procedure in the present embodiment.

In FIG. 27, parts which are the same as the processes in FIG. 23 are assigned the same reference numbers, and their description shall be omitted.

In the case where the monitor application having the Java® program identifier 301 abnormally terminates for the first time, the MA management unit main 2101 requests, as a result of S2303, the MA selection unit B 2106 to select an alternative program, and the MA selection unit B 2106 first counts the number of abnormal terminations (step S2701). More specifically, the details stored in the primary storage unit 511 are changed from that in FIG. 26(*a*) to that in FIG. 26(*b*). Next, referring to the number of times the program has abnormally terminated shown in FIG. 26, it is judged whether or not the number of abnormal terminations is equal to or greater than a predetermined number of times (N times) (step S2702). Here, in the case where the number of abnormal terminations is not equal to or greater than the predetermined number of times (N times) (No in step S2702), the MA selection unit B 2106 selects the monitor application having the Java® program identifier 301 (step S2704), and the processes from S2305 onward are subsequently carried out. On the other hand, in the case where the number of abnormal terminations is equal to or greater than the predetermined number 5 of times (N times) (Yes in step S2702), the MA selection unit B 2106 selects a program other than the monitor application having the Java® program identifier 301 (for example, the EPG 1202) (step 52703), and the processes from S2305 onward are subsequently carried out.

In this example, the column 2602 in FIG. 26(*b*) is referred to, and it is found out that the number of abnormal terminations up to this point is 1. Therefore, the MA selection unit B 2106 selects the monitor application having the Java® program identifier 301. From there, the processes from S2305 onward are carried out.

Next, in the case where the monitor application having the Java® program identifier 301 abnormally terminates for the second time, the MA management unit main 2101 requests, as a result of S2303, the MA selection unit B 2106 to select an alternative program, and the MA selection unit B 2106 first changes the details stored in the primary storage unit 511, from that in FIG. 26(*b*) to that in FIG. 26(*c*). Next, it refers to the number of times the program has abnormally terminated shown in FIG. 26. At this time, the column 2602 in FIG. 26(*c*) is referred to, and it is found out that the number of abnormal terminations up to this point is 2. Here, since the predetermined number of times (in this case, 2 times) has already been reached, the MA selection unit B 2106 selects a program other than the monitor application having the Java® program identifier 301. From there, the processes from S2305 onward are carried out.

As such, with respect to the abnormal termination for the monitor application having the Java® program identifier 301, it is possible to activate, once again, the monitor application having the Java® program identifier 301 up to the first time, and activate a program other than the monitor application having the Java® program identifier 301 for the second time onward.

Note that although description is carried out for the case where N=2, N may be any integer equal to or greater than 1.

Fourth Embodiment

The first to third embodiments describe cases where the program to be selected is determined in advance, as the alternative program selection method used by the MA selection unit B 2106. However, as another selection method, it is also possible to have a method in which a list of programs serving as selection candidates is presented to the viewer, and the viewer is made to do the selection.

Figure 28:
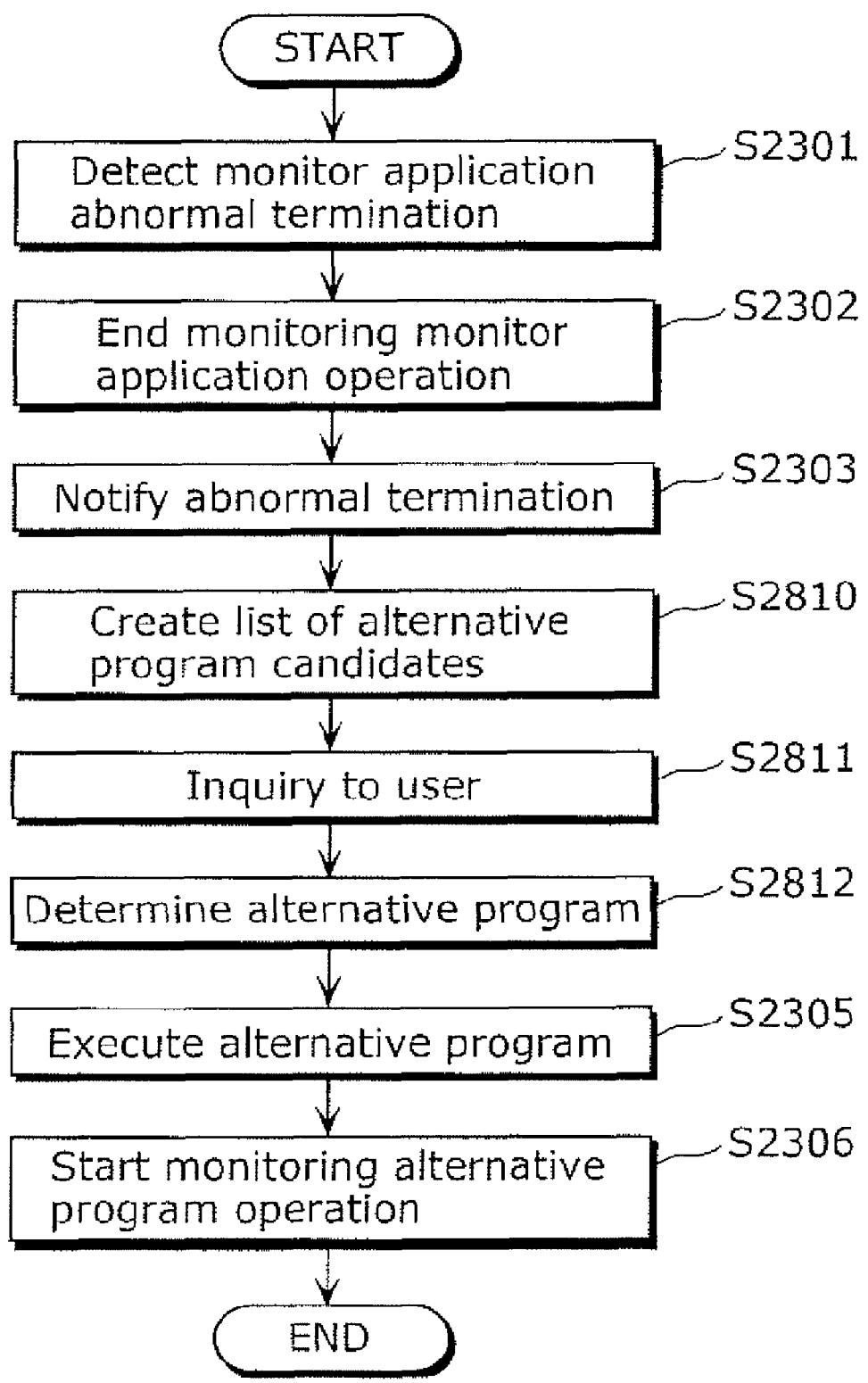
FIG. 28 is a flowchart showing the operation when a list of selection candidate programs is presented to the user and the user is made to select, in the fourth embodiment.

FIG. 28 is a flowchart showing the operational procedure in the present embodiment. Moreover, parts which are the same as the processes in FIG. 23 are assigned the same reference numbers, and their description shall be omitted.

Figure 29:
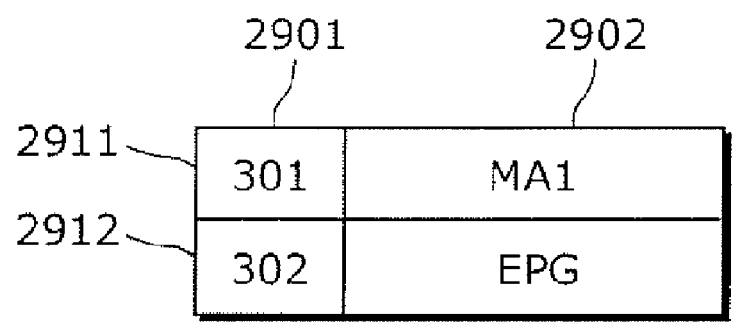
FIG. 29 is a diagram schematically representing an example of a list of programs that can be selected as an alternative program, in the fourth embodiment.

When, as a result of S2303, the MA management unit main 2101 requests the MA selection unit B 2106 to select an alternative program, the MA selection unit B 2106 first creates a list of programs which can be selected as the alternative program (S2810). Next, the MA selection unit B 2106 presents the created list of programs to the viewer, and prompts the selection (S2811). The MA selection unit B 2106 determines the alternative program, based on the selection of the viewer (S2812). From there, the processes from S2305 onward are carried out, Here, FIG. 29 is a table schematically representing the list of programs which can be selected as the alternative program, created by the MA selection unit B 2106 in S2810. A column 2901 is a Java® program identifier. A column 2902 is a program name. Row 2911 and row 2912 are the set of information of the Java® program. The Java® program in row 2911 is defined by the set of the identifier "301" and the program name "MA1". The Java® program in row 2912 is defined by the set of the identifier "701" and the program name "EPG".

Note that it is possible to use details other than those shown in FIG. 29, as long as they include information which allows the MA selection unit B 2106 to distinguish the programs.

Furthermore, for as long as activation is possible, the programs included in the list may be located anywhere.

Figure 30:
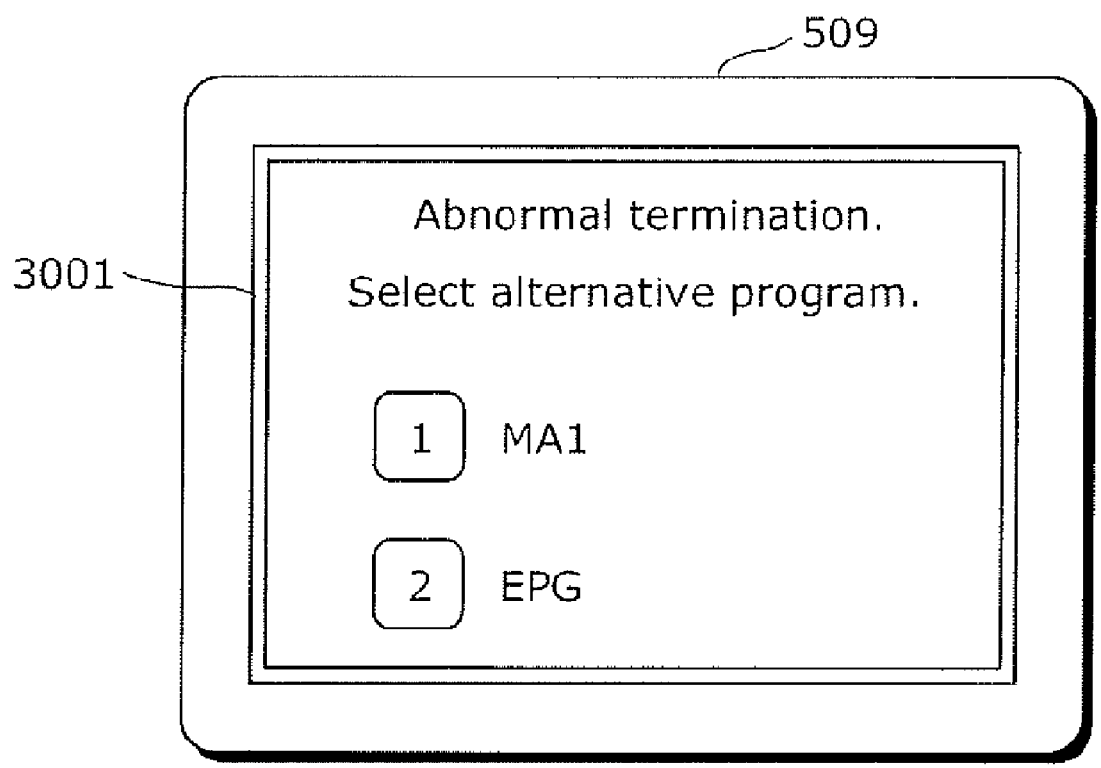
FIG. 30 is a diagram showing an example of a display presented to the user, in the fourth embodiment.

FIG. 30 is a diagram showing an example of the display presented to the viewer in S2810. Here, a dialogue 3001 is displayed on the display 509. The viewer selects a program from the displayed programs. For example, "MA1" is selected by pressing the button "1" on the remote control. In this case, since the MA selection unit B 2106 is made aware that the viewer has selected the identifier "301", the MA selection unit B 2106 determines the program having the identifier "301" as the alternative program. Furthermore, in the case where the viewer selects "EPG" by pressing button "2" on the remote control, since the MA selection unit B 2106 is made aware that the viewer has selected the identifier "701", the MA selection unit B 2106 determines the EPG 1202, which is the program having the identifier "701"; as the alternative program.

Note that it possible to user other details as long as they at least include information that allows the viewer to distinguish the programs.

Furthermore, any display format and selection method may be used as long as, at least, the program selected by the viewer is communicated to the MA selection unit B 2106.

Furthermore, it is also possible to have, through the satisfaction of a certain condition, the MA selection unit B 2106 select the alternative program without waiting for the selection by the viewer. For example, it is possible that, in the case where after presenting to the viewer, the viewer does not make a selection even when 30 seconds have elapsed, the MA selection unit B 2106 selects, as the alternative program, the EPG 1202 which is the program having the identifier "701".

Fifth Embodiment

It is possible that, upon receiving the abnormal termination notification from the MA monitoring unit 2105 in the first to third embodiments, the MA selection unit B 2106 may notify the viewer of the occurrence of the abnormal termination.

Figure 31:
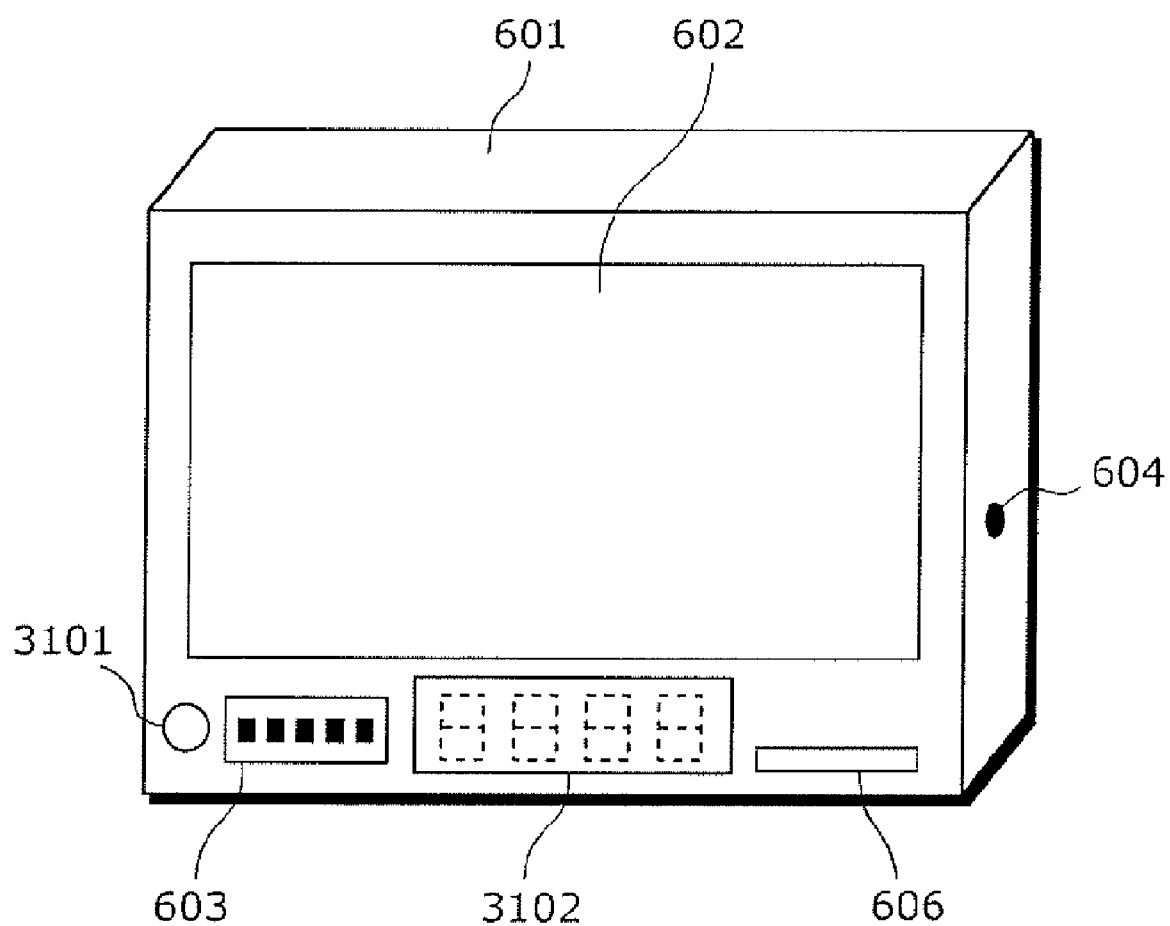
FIG. 31 is a diagram showing an example of a method of displaying to the user, in the fifth embodiment.

FIG. 31 is a diagram showing an example of a method for notifying the viewer. For example, notification is possible by displaying on a seven segment LED 3102 in the main body of the terminal apparatus, or by lighting a lamp 3101 in the main body of the terminal apparatus.

Figures 32, 33:
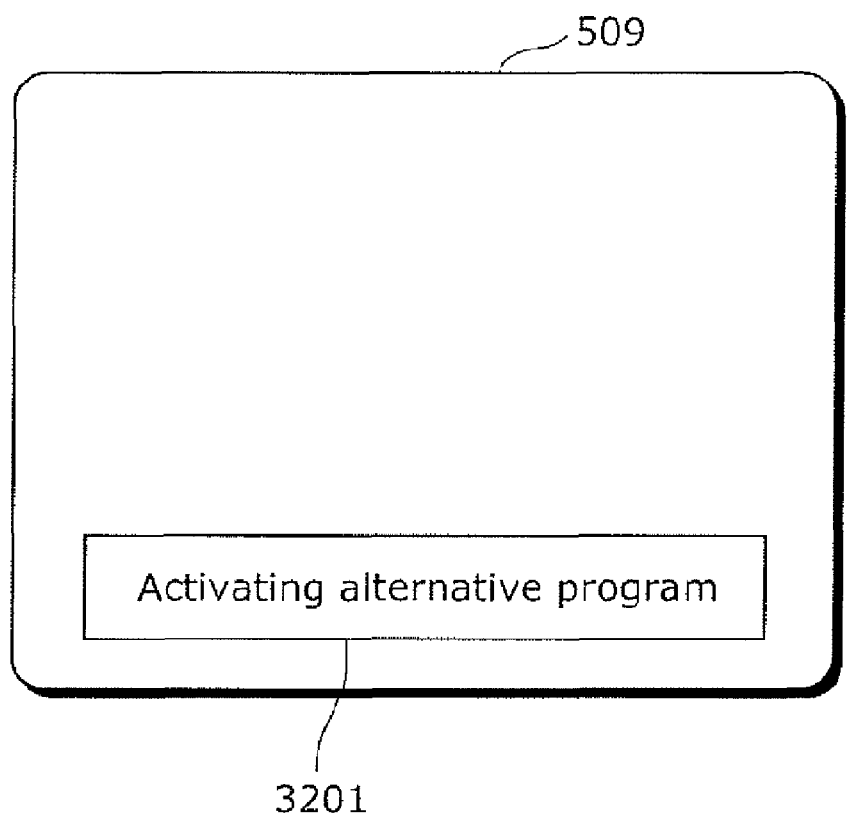
FIG. 32 is a diagram showing an example of a method of displaying to the user, in the fifth embodiment.
FIG. 33 is a schematic diagram showing details of the XAIT according to the present invention.

FIG. 32 shows an example of the display made in the case where the abnormal termination of the monitor application is notified by displaying on the display 509. The message to the viewer is stated inside a dialogue 3201 and, by displaying the dialogue 3201 on the display 509, the viewer can be notified of the occurrence of the abnormal termination.

Note that aside from the methods shown as examples in FIGS. 31 and 32, implementation is possible as long as the presentation is made using a method which allows recognition by the viewer.

Sixth Embodiment

The present embodiment describes the case where the Java® program activated based on the information in the XAIT obtained from the head end 101 is a special monitor application which is registered, in place of a program within the library 1202b of the OS 1201, as the Java® program that can be referred to by the POD 504, and which can transmit and receive messages to and from a subprogram in the POD 504.

For example, by switching the Java® program in place of a dialogue display program which is a program within the library 1202b of the OS 1201, it becomes possible for the Java® program to carry out the transmission and reception of messages to and from the PPV subprogram 805 which is a subprogram within the POD 504.

Unlike in the other embodiments, in the case of the present embodiment, the program within the library 1202b of the OS 1201 always operates continuously and, even in the case where the Java® program is registered, the program within the library 1202b of the OS 1201 need not be terminated. However, even in this case, when the registered Java® program abnormally terminates and the same Java® program is activated once again, the re-occurrence of abnormal termination can be fairly expected, and thus, hindering the request (for example, PPV viewing) made by the user. The present embodiment describes the application of the present invention for such problem.

The present embodiment first describes the registration process and the registration-cancellation process for the Java® program that can be referred to by the POD 504 in place of the program within the library 1202b of the OS 1201, and then, the main topic which is the process in the case where the Java® program abnormally terminates shall be discussed.

FIG. 33 shows an example of information in the XAIT, regarding the Java® programs, in the present embodiment. In FIG. 33, elements which are the same as in FIG. 20 are assigned the same reference numbers, and their description shall be omitted. Column 3311 and column 3312 are the set of information for a Java® program. The Java® program in column 3311 is defined by the set of a Java® program identifier "701", control information "autostart", a DSMCC identifier "1", a program name "/a/PPV1Xlet", and a monitor application identifier "1". The Java® program in column 3312 is defined by the set of a Java® program identifier "702", control information "present", a DSMCC identifier "1", a program name "/b/PPV2Xlet", and a monitor application identifier "2". Here, although only five items of information are stipulated, the present invention can be implemented even when more information is defined.

Figure 34:
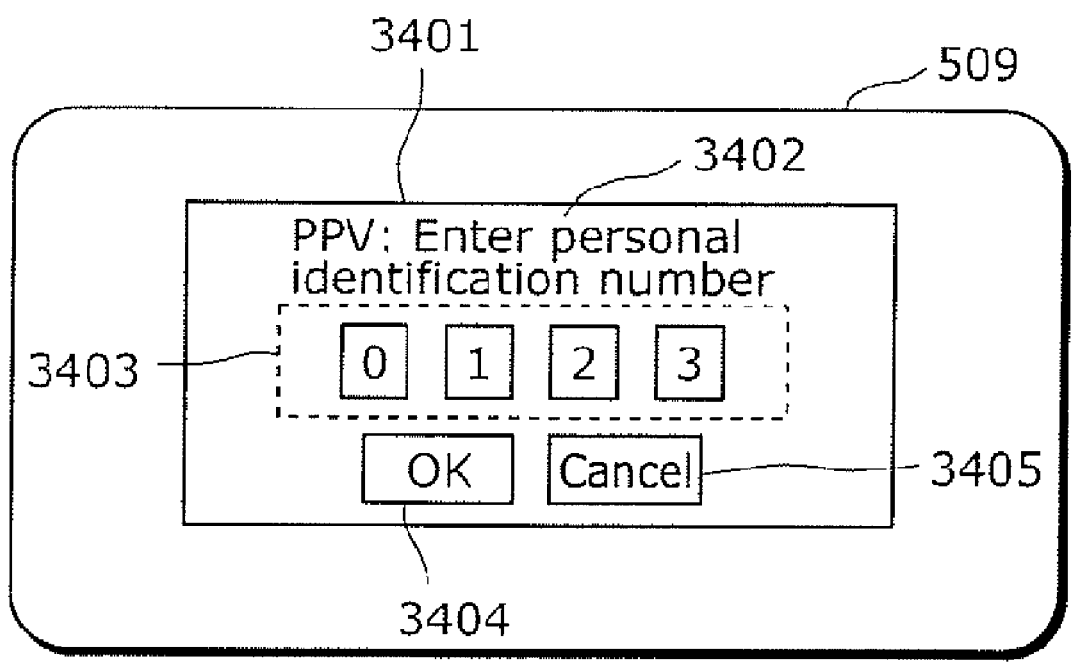
FIG. 34 is an example of a message prompting the purchase of a program, according to the present invention

Here, it is assumed that the Java® program "PPVb 1Xlet" is a program for displaying program information serving as the subject of PPV, in cooperation with the PPV subprogram 805 held within the POD 504. When the PPV subprogram 805 sends the information to be displayed on the screen to the CPU 514 of the terminal apparatus 500 in the case where the Java® program "PPV1Xlet" is not present in the terminal apparatus 500, the dialogue display program included in the library 1202b of the OS 1201 displays, on the display 509, the message for prompting program purchasing shown in FIG. 34. 3401 is a dialogue box which holds display elements such as: a message 3402; a personal identification number box 3403 for inputting a 4 digit personal identification number; an OK button 3403; and a cancel button 3405. However, since program details are unknown in this display, the user needs to check the program details by referring to books and the like, such as a program guide, thereby proving inconvenient.

Figure 35:
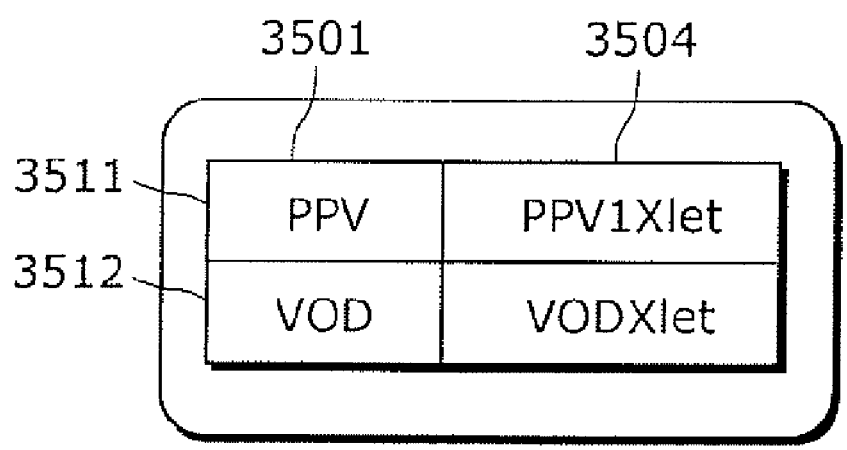
FIG. 35 is an example of the appearance of the storage of a Java® program according to the present invention.

In the terminal apparatus 500, when the Java® program "PPV1Xlet" is activated, the Java® program "PPV1Xlet" registers itself in the POD Lib 1205e of the Java® library 1205, as the Java® program that can be referred to by the POD 504. During registration, it also simultaneously registers "PPV" as its own Java® program module identifier. The POD Lib 1205e stores the registered details in the secondary storage unit 510. FIG. 35 shows an example of the appearance of the secondary storage unit 510 storing the information of the registered Java® program that can be referred to by the POD 504. In this example, storage is done in a table format, and a column 3501 stores a Java® program module identifier, and a column 3504 stores the name of the Java® program. A row 3511 and a row 3512 indicate the registered Java® programs. Row 3511 is the set of the module identifier "PPV", and the Java® program name "PPV1Xlet". Row 2312 is the set of the module identifier "VOD" and the Java® program name "VODXlet". Note that although the Java® program module identifier 3501 and the Java® program name 3504 are stored here, implementation is possible as long as at least the Java® program module identifier and information allowing the unique identification of the registered Java® program are stored.

Figure 36:
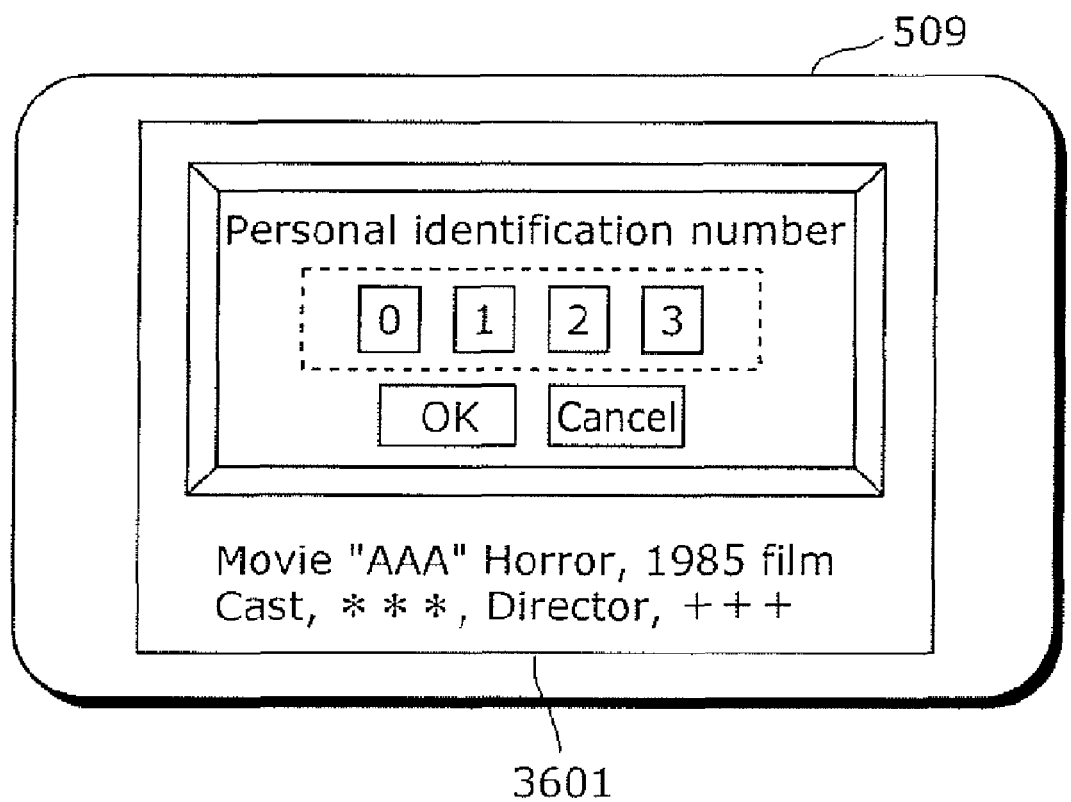
FIG. 36 is an example of the on-screen display by the display according to the present invention.

Through the notification of the information of the registered Java® program to the POD 504 by the POD Lib 1205e, the transmission and reception of messages between a subprogram within the POD 504 and the registered Java® program becomes possible. For example, it is possible for the PPV subprogram 805 within the POD 504 to send details of a program which is subject to PPV purchasing, to the registered Java® program indicated in row 3511 in FIG. 35 and, in place of the dialogue display program, such Java® program can carry out the display of the program details on the display 509 as in FIG. 36. Here, 3601 shows the display of program information, and the same display as that of the dialogue display program, carried out by the registered Java® program.

However, although the dialogue display program of the library 1202b of the OS 1201 does not display anything here, in actuality, it may also be executed together with the registered Java® program. Here, the POD 504 refers to the type of the registered Java® program and identifies the Java® program which is the message sending partner. Specifically, the dialogue display program of the library 1202b of the OS 1201 holds a module identifier "PPV" and the Java® program to be registered is made to hold the same module identifier "PPV" as the dialogue display program of the library 1202b of the OS 1201, and the POD 504 refers to this module identifier and identifies the Java® program which is the message transmission and reception partner.

In the present embodiment, it is assumed that the respective subprograms of the POD 504 cannot transmit and receive messages simultaneously between plural programs having the same module identifier (in other words, with respect to a particular module identifier, the respective subprograms of the POD 504 are allowed transmission and reception with a maximum of only 1 program).

Figure 37:
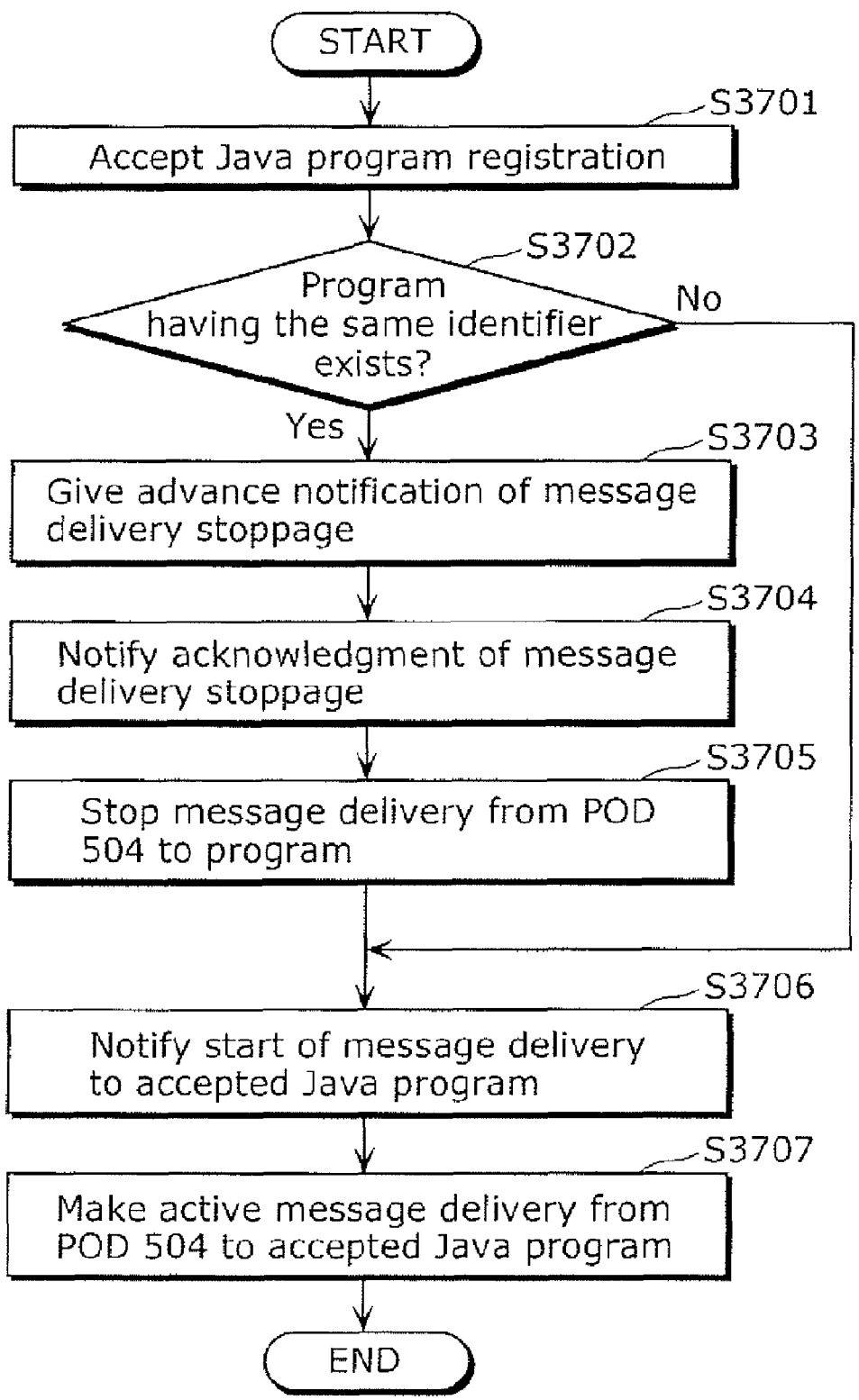
FIG. 37 is a flowchart summarizing the operation of the POD Lib in the case where a Java® program is registered in the POD Lib.

FIG. 37 is a flowchart summarizing the operation of the POD Lib 1205e in the case where a Java® program is registered in the POD Lib 1205e.

Upon accepting a registration for message delivery (includes at least one of transmission and reception, or both) with the Java® program, the POD Lib 1205e stores necessary information (for example, information such as that shown in FIG. 35) in the secondary storage unit 510 (step S3701), and judges whether or not there exists a program having the same module identifier as the Java® program whose registration was accepted, by comparing the module identifier of the Java® program whose registration was accepted in step S3701 with the module identifiers of programs already stored in the secondary storage unit 510 and programs within the library 1201b (step S3702).

As a result, in the case where a program having the same module identifier exists (Yes in step S3702), the POD Lib 1205e gives advanced notification of the stoppage of message delivery to the subject of the message delivery up to that point, specifically, another Java® program registered in the secondary storage unit 510 or a program within the library 1201b of the OS 1201 (step S3703).

After ending necessary processes (internal processes needed for the stoppage of message delivery with the POD 504 (in other words, de-registration of the message delivery registration)), the Java® program and the library 1201b of the OS 1201 receiving the stoppage notice subsequently notify the acknowledgment of the message transmission stoppage to the POD Lib 1205e (step S3704).

Upon receiving the acknowledgment notice, the POD Lib 1205e cancels (in other words, de-registers) the message delivery registration with the Java® program which already exists (in other words, registered in the secondary storage unit 510, and the subject of the stoppage of message delivery between the POD 504) or the program within the library 1201b of the OS 1201, and stops the message delivery with such program (step S3705). Then, the start of message delivery is notified to the Java® program whose registration was accepted in step S3701 (step S3706). Subsequently, by carrying out the registration accepting the message delivery with the POD 504, to the Java® program whose registration was received in step 53701, the message delivery is made valid (step S3707).

On the other hand, in the case where a program having the same module identifier does not exist (No in step 3702), the POD Lib 1205e notifies the start of message delivery to the Java® program whose registration was accepted in step S3701 (step S3706). Then, by carrying out the registration accepting the message delivery with the POD 504, to the Java® program whose registration was received in step S3701, the message delivery is made valid (step S3707).

Figure 38A:
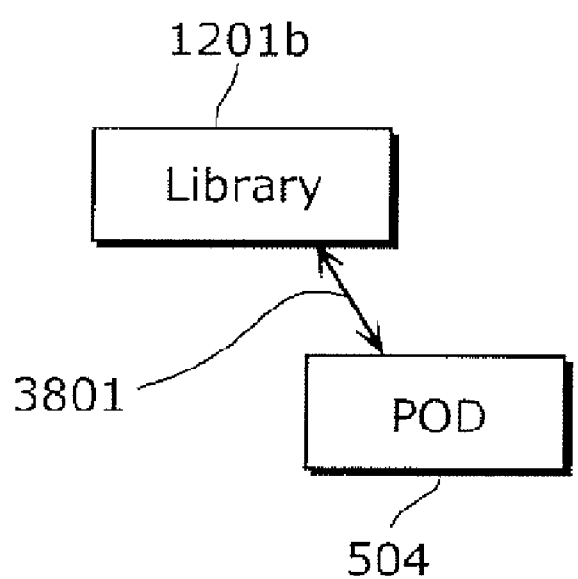
FIGS. 38(a) and (b) are schematic diagrams showing the change of destination of the message delivery with the POD according to the present invention.
Figure 38B:
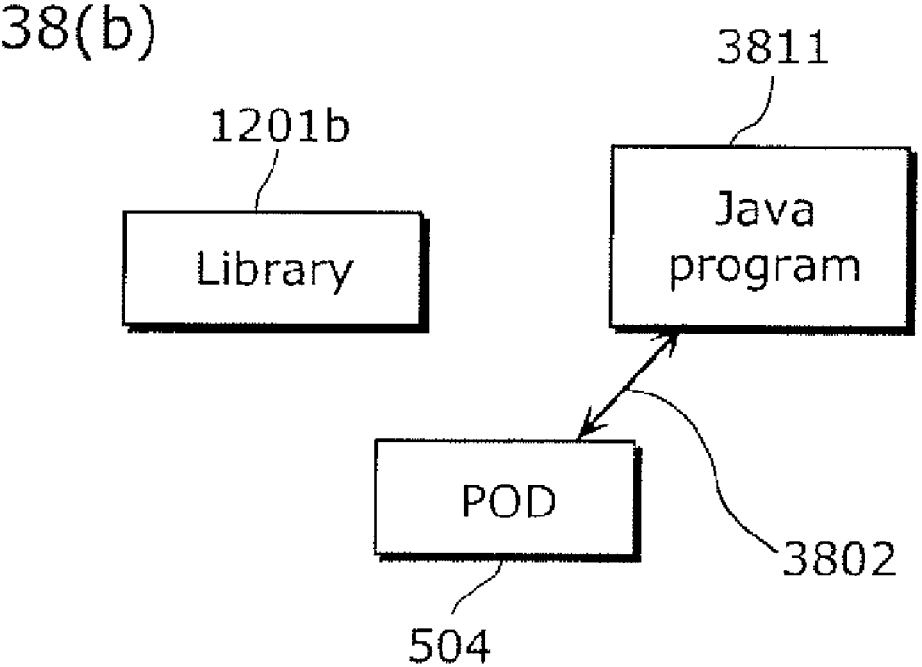

FIG. 38 and FIG. 39 are schematic diagrams, based on the present operational flowchart (FIG. 37), showing the change of destinations in the message delivery with the POD 504. FIG. 38(a) represents the state in which the Java® program is not registered, and message delivery with the POD 504 is carried out with the library 1201b of the OS 1201 (more specifically, for example, the dialogue display program of the library 1201b). An arrow 3801 represents the message delivery. In the state in FIG. 38(a), when a Java® program 3811 having the same module identifier as the program within the library 1201b of the OS 1201 is registered, the message delivery between the POD 504 and the library 1201b indicated by the arrow 3801 is stopped and message delivery between the POD 504 and the Java® program 3811 is set, in accordance with the flowchart in FIG. 37, and the state shown in FIG. 38(b) is assumed.

Figure 39A:
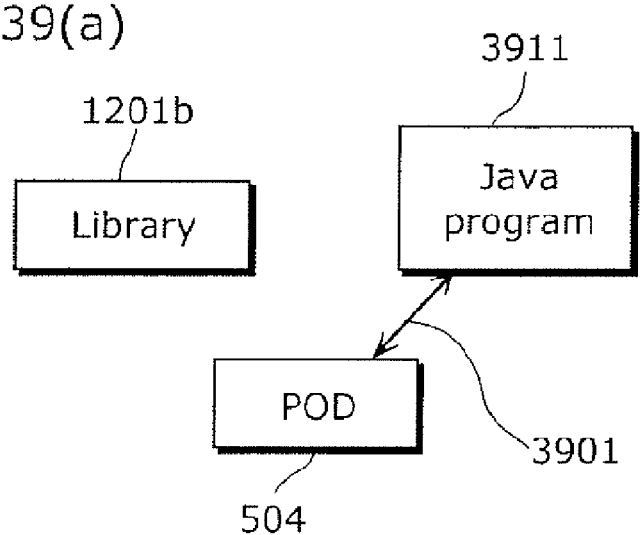
FIGS. 39(a) and (b) are schematic diagrams showing the change of destination of the message delivery with the POD according to the present invention.
Figure 39B:
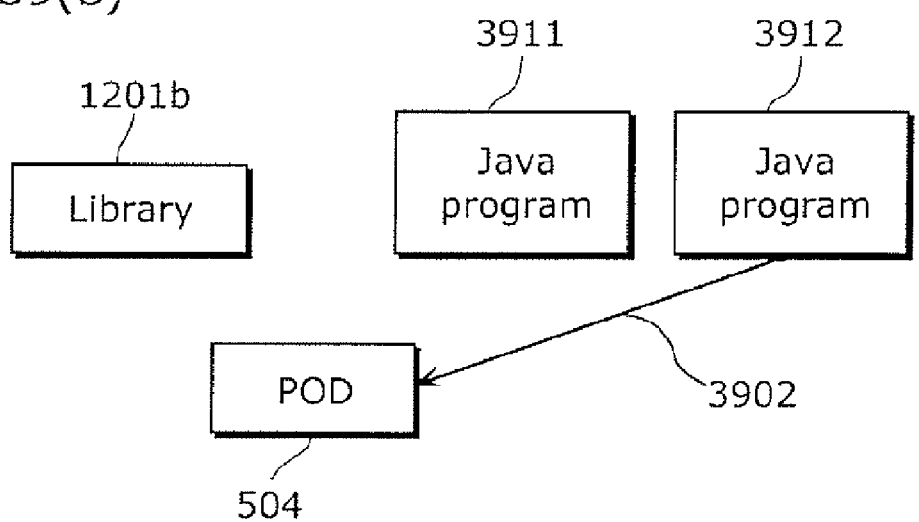

FIG. 39(a) represents the state in which a Java® program 3911 is registered, and message delivery with the POD 504 is carried out with the registered Java® program 3911. An arrow 3901 represents the message delivery. In the state in FIG. 39(a), when a Java® program 3912 having the same module identifier as the Java® program 3911 is registered, the message delivery between the POD 504 and the Java® program 3911 indicated by the arrow 3901 is stopped and message delivery between the POD 504 and the Java® program 3912 is set (arrow 3902), in accordance with the flowchart in FIG. 37, and the state shown in FIG. 39(b) is assumed.

Furthermore, together with accepting the registration of a Java® program, the POD Lib 1205e also accepts registration cancellation (in other words, requests for de-registration).

Figure 40:
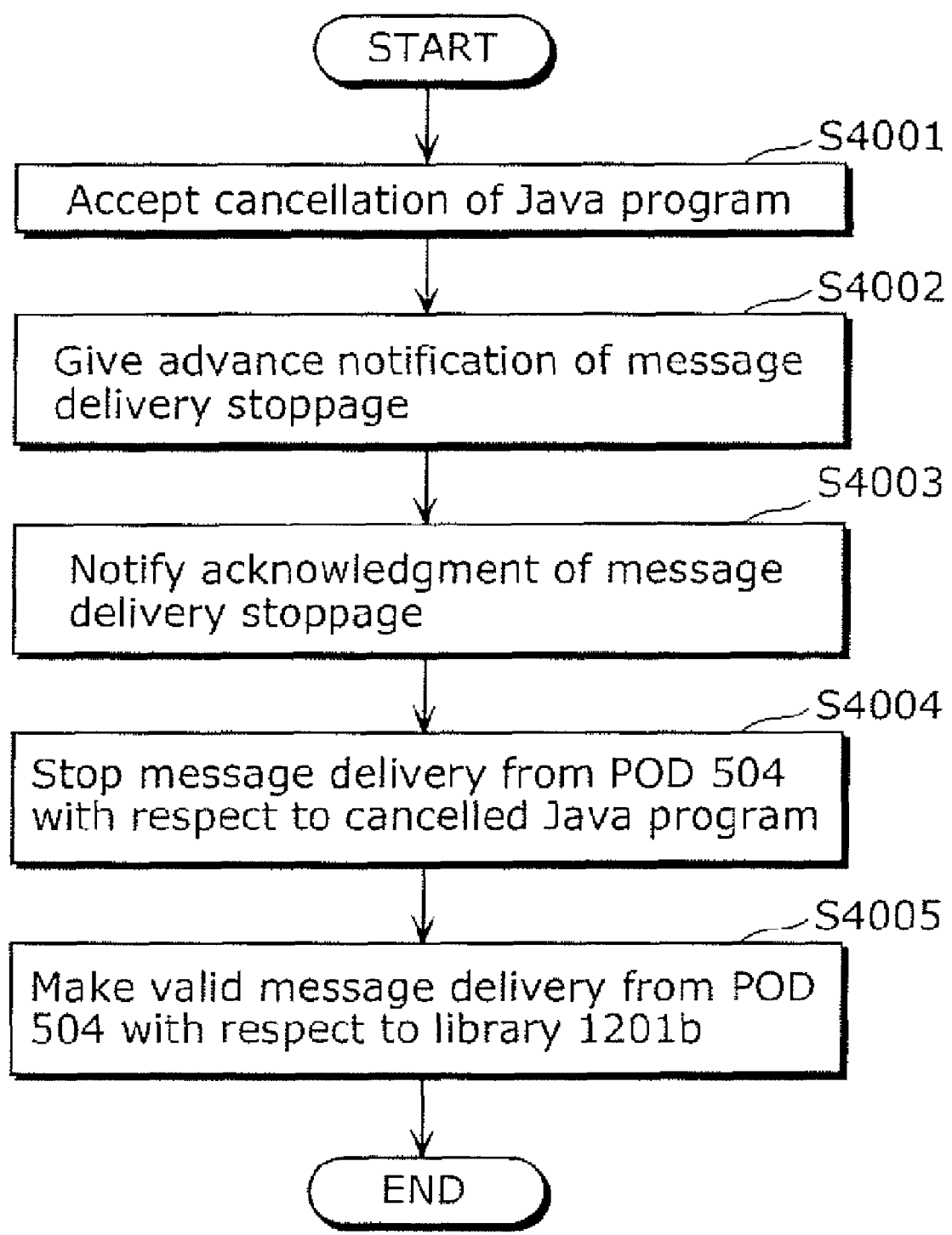
FIG. 40 is a flowchart summarizing the operation of the POD Lib in the case where the POD Lib cancels the registration of a Java® program, according to the present invention.

FIG. 40 is a flowchart summarizing the operation of the POD Lib 1205e in the case where the POD Lib 1205e cancels the registration of a Java® program (in other words, de-registering the registration for message delivery with the Java® program registered in the secondary storage unit 510).

Upon accepting the cancellation of the Java® program (step S4001), the POD Lib 1205e gives an advanced notification, to the Java® program which is the subject of the cancellation, that message delivery will be stopped (step S4002). After ending necessary processes (necessary internal processes that need to be done before the stoppage of message delivery with the POD 504 (in other words, de-registration of the message delivery registration)), the Java® program receiving the notice subsequently notifies the acknowledgment of the message transmission stoppage to the POD Lib 1205e (step S4003). Upon receiving the acknowledgment notice, the POD Lib 1205e stops the message delivery between the POD 504 and the subject Java® program (step S4004) by cancelling (in other words de-registering) the registration for message delivery to the Java® program which is the subject of the cancellation request, among the Java® programs registered in the secondary storage unit 510. Subsequently, the POD Lib 1205e makes valid the message delivery between the POD 504 and the library 1201b (more specifically, the program included therein, which has the same module identifier as the Java® program which is the subject of the cancellation,) of the OS 1201 (step S4005), by carrying out the registration accepting the message delivery with the POD 504, for the library 1201b of the OS 1201. Here, when the program among the programs within the library 1201b of the OS 1201, having the same module identifier as the Java® program which is the subject of the cancellation is not operating, the same operation becomes possible by making valid the message delivery after activating the program having the same module identifier.

Furthermore, in the case where there are other Java® programs registered in the secondary storage unit or there is a newly registered Java® program and the carrying out of message delivery with any one of such Java® programs is desired (or can be carried out), it is also possible to make valid the message delivery with the subject Java® program by carrying out the registration accepting message delivery between the POD 504 and the subject Java® program.

Next, the process in the case where the Java® program abnormally terminates, which is the main topic, shall be described.

Figure 41:
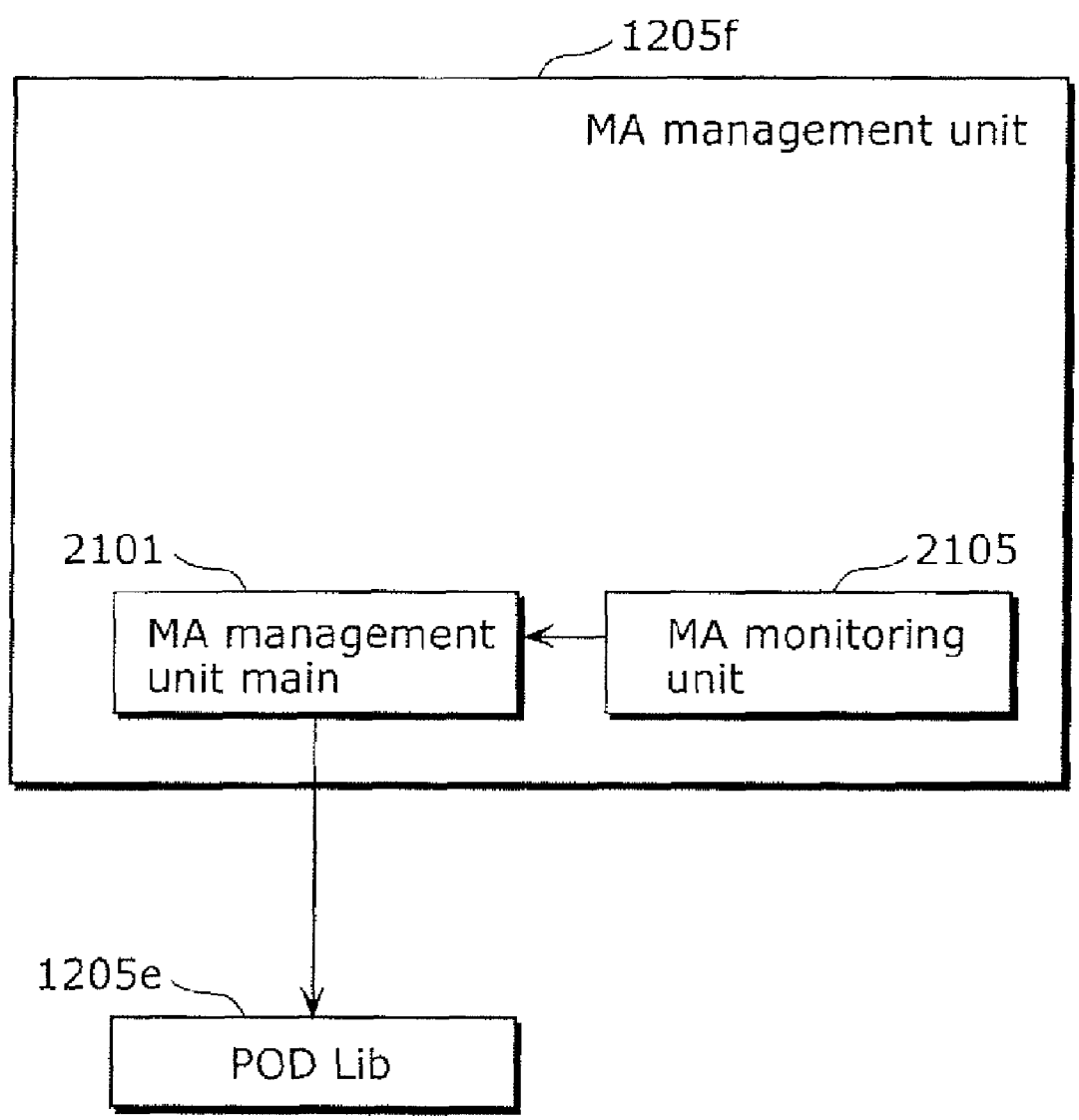
FIG. 41 is a configuration diagram for processing in the case where the Java® program abnormally terminates, according to the present invention.
Figure 42:
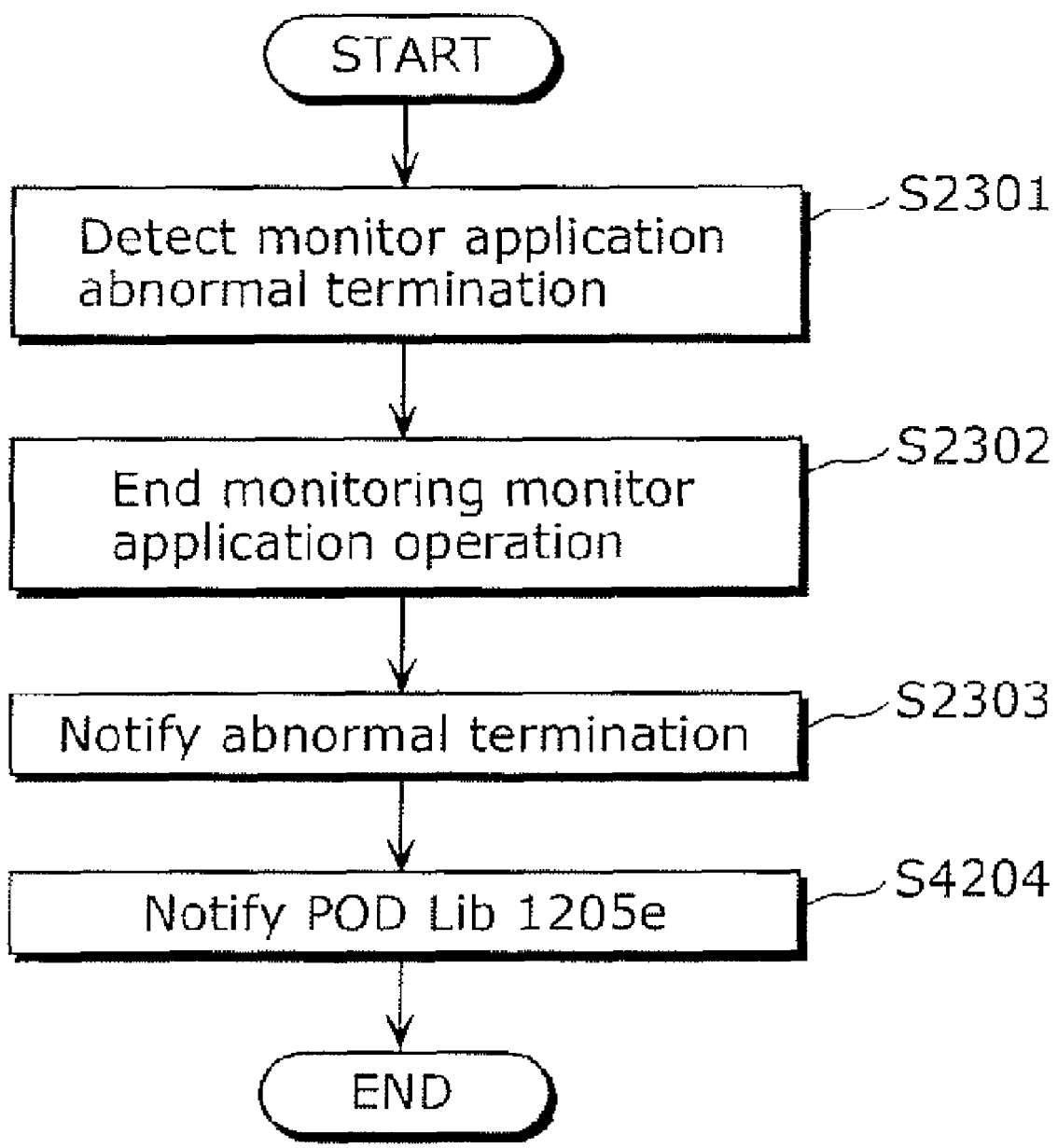
FIG. 42 is a flow chart showing the process in the case where the Java® program abnormally terminates, according to the present invention.

The process in the case where the Java® program 3811 abnormally terminates in the state in FIG. 38(b) shall be described. Referring to FIG. 41, the MA management unit 1205f detects the abnormal termination, as well as notifies the POD Lib 1205e of such abnormal termination. FIG. 42 is a flowchart summarizing the operation during such time. Processes which are the same as those in FIG. 23 are assigned the same reference numbers, and their description shall be omitted. When the MA monitoring unit 2105 detects the abnormal termination of the currently monitored monitor application (here, the Java® program 3811) (S2301), the MA monitoring unit 2105 ends the monitoring of the monitor application which has abnormally terminated (S2302), and notifies the MA management unit main 2101 of the occurrence of the abnormal termination (S2303). The MA management unit main 2101 notifies the POD Lib 1205e of the termination of the monitor application (S4204).

Figure 43:
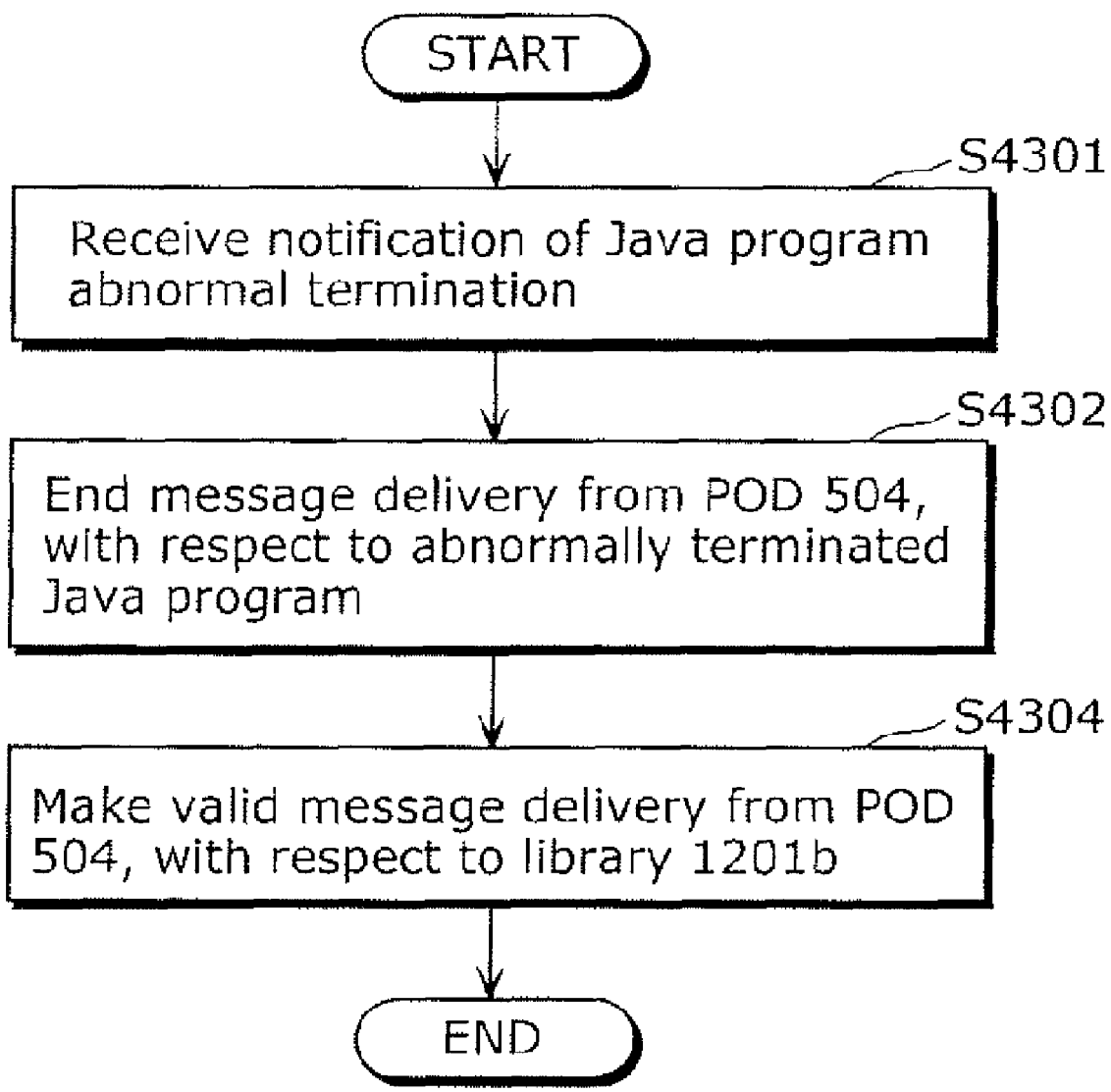
FIG. 43 is a flow chart showing the process in the case where the Java® program abnormally terminates, according to the present invention.

Upon receiving the abnormal termination notification, the POD Lib 1205e carries out the process for cancelling the registration of the message delivery with the Java® program 3811 which has abnormally terminated. FIG. 43 is a flowchart summarizing the operation during such time. Upon receiving the abnormal termination of the Java® program (S4301), the POD Lib 1205e stops the message delivery between the POD 504 and such Java® program (step S4302) by cancelling (in other words, de-registering) the registration of the message delivery between the POD Lib 1205e and such Java® program. Subsequently, by carrying out the registration accepting the message delivery with the POD 504 with respect to the library 1201b of the OS 1201, the POD Lib 1205e makes valid the message delivery with the library 1201b of the OS 1201 (step S4304).

Figure 44:
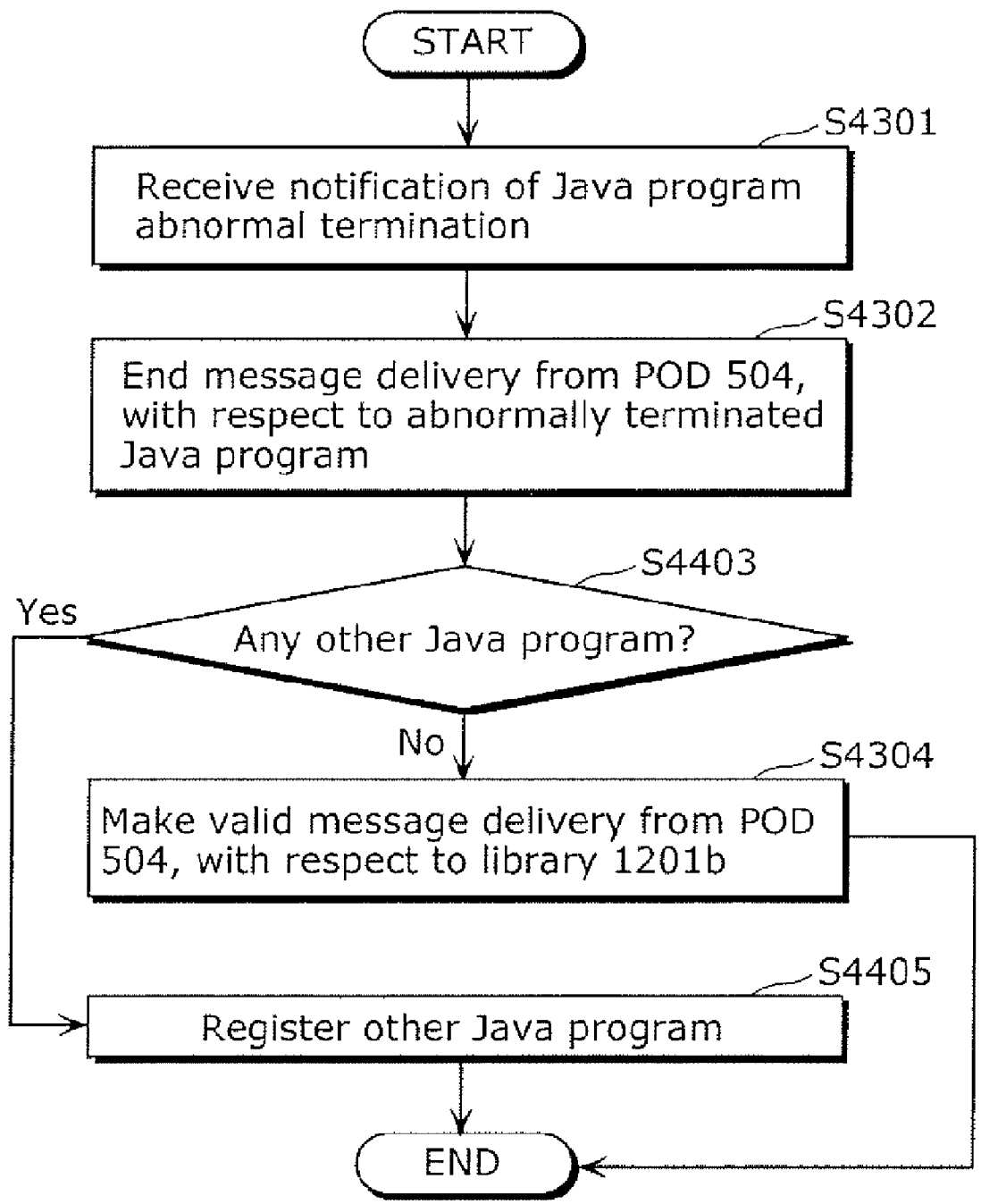
FIG. 44 is a flow chart showing the process in the case where the Java® program abnormally terminates, according to the present invention.

Likewise, description shall be made for the case where, as shown in FIG. 39(b), another Java® program (here, referring to 3911) having the same module identifier is stored in the secondary storage unit 510. In the case where the Java® program 3912 abnormally terminates, it is also possible to have the POD Lib 1205e register the other Java® program 3912 having the same module identifier, instead of carrying out, with respect to the library 1201b of the OS 1201, the registration accepting the message delivery with the POD 504. FIG. 44 is a flowchart summarizing the operation during such time. Processes which are the same as those in FIG. 43 are assigned the same reference numbers, and their description shall be omitted. When the message delivery between the POD 504 and the Java® program which has abnormally terminated is stopped (step S4302), it is checked whether or not another Java® program having the same module identifier exists (S4403). In the case where another Java® program exists (Yes in S4403), such Java® program is registered. This registration process follows the flowchart shown in FIG. 37, and assumes the process in the case of a No in S3702. In the case where another Java® program does not exist, the POD Lib 1205e makes valid the message delivery with the library 1201b of the OS 1201 (step S4304) by carrying out the registration accepting the message delivery with the POD 504, with respect to the library 1201b of the OS 1201.

Note that even in the case where another Java® program having the same module identifier exists, it is also possible to carry out the process shown in FIG. 43 (in other words, to transfer to the process in S504).

Moreover, although the present embodiment assumes that the operation is performed with the PPV subprogram 805 within the POD 504 and a Java® program carrying out the message exchange, implementation is possible even for the case where operation is performed with the message exchange being carried out between any subprogram in the POD 504, aside from the PPV, and any subprogram in the terminal apparatus 500. Furthermore, implementation is also possible even when the Java® program is a mix of a part that is in a form based on a format stipulated in the Java® specification and a part in a form that can be directly executed by the CPU; as well as when the Java® program is structured only in the form that can be directly executed by the CPU.

Note that, although in the present embodiment, details regarding the registered Java® program are stored in the secondary storage program 510, storage in the primary storage unit 511 is also possible.

According to the present embodiment, even in the case where the Java® program which is registered so as to be able to carry out message transmission and reception with the POD 504 abnormally terminates, the POD 504 can continue message transmission and reception with a program in the terminal by resuming the message transmission and reception with a program in the library 1201b of the OS 1201.

INDUSTRIAL APPLICABILITY

The program execution device according to the present invention is useful in improving the operational stability of a digital television receiver and, aside from the digital television receiver, can also be applied for the improvement of the operational stability of information devices controlled through software, such as a personal computer, a mobile phone, and the like.

The invention claimed is:

1. A program execution apparatus that executes a program, said program execution apparatus comprising:
    a first program selector operable to select, as a program to be executed, a program which is downloaded to a storage and executed;
    a program monitor operable to monitor an operational state of a currently executed program;
    a second program selector operable to select, as a program to be executed, a program that is of the same type as the currently executed program, in the case where abnormal termination of the currently executed program is detected by said program monitor;
    a processor operable to execute the program selected by said first program selector and, in the case where abnormal termination of the currently executed program is detected by said program monitor, to execute the program selected by said second program selector;
    a cause obtainer operable to obtain a cause of the abnormal termination of the program detected by said program monitor; and
    a countermeasure executioner operable to execute a countermeasure based on the cause of the abnormal termination,
    wherein said processor is operable to execute the program selected by said second program selector, after the countermeasure is executed by said countermeasure executioner, and
    wherein upon selection and execution of the program selected by said second program selector, the program that experienced abnormal termination is prevented from further execution.

2. The program execution apparatus according to claim 1, wherein said second program selector is operable to select, as the program to be executed, a program which is different from the program selected by said first program selector.

3. The program execution apparatus according to claim 1, wherein said second program selector is operable to select, as the program to be executed, a program which is the same as the program selected by said first program selector.

4. The program execution apparatus according to claim 1, wherein said second program selector is operable to select, as the program to be executed:
    a program which is the same as the program selected by said first program selector, in the case where a predetermined condition is not satisfied; and
    a program which is different from the program selected by said first program selector, in the case where the predetermined condition is satisfied.

5. The program execution apparatus according to claim 4, wherein said second program selector is operable to perform selection in the case where the predetermined condition is whether or not the number of abnormal terminations of the program which said program monitor has detected as having abnormally terminated exceeds a predetermined number, and to determine that:
    the predetermined condition is not satisfied in the case where the number of abnormal terminations of the program does not exceed the predetermined number; and
    the predetermined condition is satisfied in the case where the number of abnormal terminations of the program exceeds the predetermined number.

6. The program execution apparatus according to claim 4, wherein said second program selector is operable to perform selection in the case where the predetermined condition is whether or not the number of times a program to be selected has been selected exceeds a predetermined number, and to determine that:
    the predetermined condition is not satisfied in the case where the number of times the program has been selected does not exceed the predetermined number; and
    the predetermined condition has been satisfied in the case where the number of times the program is selected exceeds the predetermined number.

7. The program execution apparatus according to claim 4, wherein said second program selector is operable to perform selection under an assumption that time information is the predetermined condition.

8. The program execution apparatus according to claim 4, wherein said second program selector is operable to perform selection under an assumption that:
    the predetermined condition is whether or not an instruction from a user is received;
    the predetermined condition is not satisfied in the case where the instruction from the user is not received; and the predetermined condition is satisfied in the case where the instruction from the user is received.

9. The program execution apparatus according to claim 1, wherein said second program selector is operable to select, as the program to be executed, a program in a non-volatile memory.

10. The program execution apparatus according to claim 1, wherein one of said first program selector and said second program selector is operable to select, as the program to be executed, a program that can be acquired via a network.

11. The program execution apparatus according to claim 1, wherein one of said first program selector and said second program selector is operable to select, as the program to be executed, a program that is included in a broadcast wave.

12. The program execution apparatus according to claim 1, wherein said program monitor is operable, upon detecting abnormal termination of the currently executed program, to present an occurrence of the abnormal termination to a user.

13. The program execution apparatus according to claim 1, wherein said program monitor is operable to present the abnormal termination occurrence to a user, using an LED display.

14. The program execution apparatus according to claim 1, wherein said program monitor is operable to present the abnormal termination occurrence to a user, using a display on a display screen.

15. A program execution apparatus that executes a program, said program execution apparatus comprising:
a first program selector operable to select, as a program to be executed, a program which is downloaded to a storage and executed;
a program monitor operable to monitor an operational state of a currently executed program;
a second program selector operable to select, based on an instruction from a user, a program that is of the same type as the currently executed program, as a program to be executed, in the case where abnormal termination of the currently executed program is detected by said program monitor; and
a processor operable to execute the program selected by said first program selector and, in the case where abnormal termination of the currently executed program is detected by said program monitor, to execute the program selected by said second program selector,
wherein upon selection and execution of the program selected by said second program selector, the program that experienced abnormal termination is prevented from further execution.

16. The program execution apparatus according to claim 15, wherein said second program selector is operable to present selectable program candidates, and to select a program selected by the user, as the program to be executed.

17. The program execution apparatus according to claim 16, wherein said second program selector is operable to present, as the selectable program candidates, at least a program in a non-volatile memory.

18. The program execution apparatus according to claim 16, wherein said second program selector is operable to present, as the selectable program candidates, at least a program that can be acquired via a network.

19. The program execution apparatus according to claim 16, wherein said second program selector is operable to present, as the selectable program candidates, at least a program that is included in a broadcast wave.

20. The program execution apparatus according to claim 16, wherein said second program selector is operable to select a predetermined program, as the program, in the case where the user does not make a selection within a predetermined time.

21. A program execution apparatus that executes a program, said program execution apparatus comprising:
a first program selector operable to select, as a program to be executed, a program which is downloaded to a storage and executed;
a program monitor operable to monitor an operational state of a currently executed program;
a second program selector operable to select, as a program to be executed, a program that is of the same type as the currently executed program and which accepts a channel selection request from a user and performs an operation, in the case where abnormal termination of the currently executed program is detected by said program monitor; and
a processor operable to execute the program selected by said first program selector and, in the case where abnormal termination of the currently executed program is detected by said program monitor, to execute the program selected by said second program selector,
wherein upon selection and execution of the program selected by said second program selector, the program that experienced abnormal termination is prevented from further execution.

22. A program execution apparatus that executes a program, said program execution apparatus comprising:
a first program selector operable to select, as a program to be executed, a program which is downloaded to a storage and executed;
a program monitor operable to monitor an operational state of a currently executed program;
a second program selector operable to select, as a program to be executed, a program that is of the same type as the currently executed program and which displays an electronic program guide, in the case where abnormal termination of the currently executed program is detected by said program monitor; and
a processor operable to execute the program selected by said first program selector and, in the case where abnormal termination of the currently executed program is detected by said program monitor, to execute the program selected by said second program selector,
wherein upon selection and execution of the program selected by said second program selector, the program that experienced abnormal termination is prevented from further execution.

23. The program execution apparatus according to claim 1, wherein said program monitor is operable to store information regarding the program which said program monitor has detected as having abnormally terminated.

24. The program execution apparatus according to claim 23, wherein said program monitor is operable to store the information in a removable recording medium.

25. The program execution apparatus according to claim 23, wherein said program monitor is operable to transmit the information to an external destination.

26. A program execution method, comprising:
first program selecting, as a program to be executed, a program which is downloaded to a storage and then executed;
program monitoring an operational state of a currently executed program;
second program selecting, as a program to be executed, a program that is of the same type as the currently executed program, in the case where abnormal termination of the currently executed program is detected in said program monitoring; and
executing, by a processor, the program selected in one of said first program selecting and said second program selecting;
obtaining a cause of the abnormal termination of the program detected in said program monitoring; and
executing a countermeasure based on the cause of the abnormal termination,
wherein, the program selected in said second program selecting is executed after the countermeasure is executed, and
wherein upon selection and execution of the program selected by said second program selecting, the program that experienced abnormal termination is prevented from further execution.

27. A non-transitory recording medium in which a program for executing an execution program is stored, the program causing a computer to execute:
first program selecting, as an execution program to be executed, an execution program which is downloaded and then executed;
program monitoring an operational state of a currently executed execution program;
second program selecting, as an execution program to be executed, an execution program that is of the same type as the currently executed execution program, in the case where abnormal termination of the currently executed execution program is detected in said program monitoring;
executing the execution program selected in one of said first program selecting and said second program selecting;
obtaining a cause of the abnormal termination of the execution program detected in said program monitoring; and
executing a countermeasure based on the cause of the abnormal termination,
wherein, the execution program selected in said second program selecting is executed after the countermeasure is executed, and
wherein upon selection and execution of the program selected by said second program selecting, the program that experienced abnormal termination is prevented from further execution.

28. A program execution method, comprising:
first program selecting, as a program to be executed, a program which is downloaded to a storage and then executed;
program monitoring an operational state of a currently executed program;
second program selecting, based on an instruction from a user, a program that is of the same type as the currently executed program, as a program to be executed, in the case where abnormal termination of the currently executed program is detected in said program monitoring; and
executing, by a processor, the program selected in said first program selecting and, in the case where abnormal termination of the currently executed program is detected in said program monitoring, to execute the program selected in said second program selecting,
wherein upon selection and execution of the program selected by said second program selecting, the program that experienced abnormal termination is prevented from further execution.

29. A non-transitory recording medium in which a program for executing an execution program is stored, the program causing a computer to execute:
first program selecting, as an execution program to be executed, an execution program which is downloaded and then executed;
program monitoring an operational state of a currently executed execution program;
second program selecting, based on an instruction from a user, an execution program that is of the same type as the currently executed execution program, as an execution program to be executed, in the case where abnormal termination of the currently executed execution program is detected in said program monitoring; and
executing the execution program selected in said first program selecting and, in the case where abnormal termination of the currently executed execution program is detected in said program monitoring, to execute the execution program selected in said second program selecting,
wherein upon selection and execution of the program selected by said second program selecting, the program that experienced abnormal termination is prevented from further execution.

30. A program execution method, comprising:
first program selecting, as a program to be executed, a program which is downloaded to a storage and then executed;
program monitoring an operational state of a currently executed program;
second program selecting, as a program to be executed, a program that is of the same type as the currently executed program and which accepts a channel selection request from a user and performs an operation, in the case where abnormal termination of the currently executed program is detected in said program monitoring; and
executing, by a processor, the program selected in said first program selecting and, in the case where abnormal termination of the currently executed program is detected in said program monitoring, to execute the program selected in said second program selecting,
wherein upon selection and execution of the program selected by said second program selecting, the program that experienced abnormal termination is prevented from further execution.

31. A non-transitory recording medium in which a program for executing an execution program is stored, the program causing a computer to execute:
first program selecting, as an execution program to be executed, an execution program which is downloaded and then executed;
program monitoring an operational state of a currently executed execution program;
second program selecting, as an execution program to be executed, an execution program that is of the same type as the currently executed execution program and which accepts a channel selection request from a user and performs an operation, in the case where abnormal termination of the currently executed execution program is detected in said program monitoring; and executing the execution program selected in said first program selecting and, in the case where abnormal termination of the currently executed execution program is detected in said program monitoring, to execute the execution program selected in said second program selecting, wherein upon selection and execution of the program selected by said second program selecting, the program that experienced abnormal termination is prevented from further execution.

32. A program execution method, comprising:

first program selecting, as a program to be executed, a program which is downloaded to a storage and then executed;

program monitoring an operational state of a currently executed program;

second program selecting, as a program to be executed, a program that is of the same type as the currently executed program and which displays an electronic program guide, in the case where abnormal termination of the currently executed program is detected in said program monitoring; and executing, by a processor, the program selected in said first program selecting and, in the case where abnormal termination of the currently executed program is detected in said program monitoring, to execute the program selected in said second program selecting, wherein upon selection and execution of the program selected by said second program selecting, the program that experienced abnormal termination is prevented from further execution.

33. A non-transitory recording medium in which a program for executing an execution program is stored, the program causing a computer to execute:

first program selecting, as an execution program to be executed, an execution program which is downloaded and then executed;

program monitoring an operational state of a currently executed execution program;

second program selecting, as an execution program to be executed, an execution program that is of the same type as the currently executed execution program and which displays an electronic program guide, in the case where abnormal termination of the currently executed execution program is detected in said program monitoring; and executing the execution program selected in said first program selecting and, in the case where abnormal termination of the currently executed execution program is detected in said program monitoring, to execute the execution program selected in said second program selecting, wherein upon selection and execution of the program selected by said second program selecting, the program that experienced abnormal termination is prevented from further execution.

* * * * *